US012559317B2

(12) United States Patent
Ikawa et al.

(10) Patent No.: US 12,559,317 B2
(45) Date of Patent: Feb. 24, 2026

(54) PICKING ASSISTANCE ROBOT AND PICKING ASSISTANCE SYSTEM

(71) Applicant: DAIO PAPER CORPORATION, Ehime (JP)

(72) Inventors: Taro Ikawa, Ehime (JP); Takuro Shimada, Kagawa (JP); Masato Onishi, Ehime (JP)

(73) Assignee: DAIO PAPER CORPORATION, Ehime (JP)

( * ) Notice: Subject to any disclaimer, the term of this patent is extended or adjusted under 35 U.S.C. 154(b) by 680 days.

(21) Appl. No.: 17/997,387

(22) PCT Filed: Jul. 12, 2021

(86) PCT No.: PCT/JP2021/026078
§ 371 (c)(1),
(2) Date: Oct. 28, 2022

(87) PCT Pub. No.: WO2022/044575
PCT Pub. Date: Mar. 3, 2022

(65) Prior Publication Data
US 2023/0264898 A1      Aug. 24, 2023

(30) Foreign Application Priority Data

Aug. 27, 2020      (JP) ................................. 2020-143905

(51) Int. Cl.
*B65G 1/137*      (2006.01)
*B65G 1/04*      (2006.01)
(Continued)

(52) U.S. Cl.
CPC ......... *B65G 1/1375* (2013.01); *B65G 1/0492* (2013.01); *B65G 1/1371* (2013.01);
(Continued)

(58) Field of Classification Search
CPC .. B65G 1/1375; B65G 1/0492; B65G 1/1371; G06K 7/10297; G06Q 10/08; G06Q 10/087
See application file for complete search history.

(56) References Cited

U.S. PATENT DOCUMENTS

2007/0046464 A1      3/2007  Onderko et al.
2009/0322486 A1*    12/2009  Gerstel ................ B65G 1/1371
                                              340/10.1
(Continued)

FOREIGN PATENT DOCUMENTS

CN      101585443      11/2009
CN      110033061      7/2019
(Continued)

OTHER PUBLICATIONS

JP-2015110481-A (Year: 2015).*
(Continued)

*Primary Examiner* — Ernesto A Suarez
*Assistant Examiner* — Laurence R Brothers
(74) *Attorney, Agent, or Firm* — IPUSA, PLLC

(57)      ABSTRACT

It is possible to provide a picking assistance robot and a picking assisting system capable of assisting a worker in efficiently picking a product. A picking assistance robot includes a housing for housing a product to which an RFID tag is attached, an RFID reader including an antenna disposed at a position capable of reading of the RFID tag when the product is housed in the housing, a terminal configured to receive a picking instruction, and a mobile body containing the housing and the RFID reader and configured to move to a location where the product is arranged based on location information of the product included in the picking instruction.

12 Claims, 13 Drawing Sheets

(51) Int. Cl.

| *G06K 7/10* | (2006.01) |
|---|---|
| *G06Q 10/08* | (2024.01) |
| *G06Q 10/087* | (2023.01) |

(52) U.S. Cl.

CPC ......... *G06K 7/10297* (2013.01); *G06Q 10/08* (2013.01); *G06Q 10/087* (2013.01)

(56) References Cited

U.S. PATENT DOCUMENTS

| 2013/0317642 | A1 | 11/2013 | Asaria et al. | |
|---|---|---|---|---|
| 2014/0350711 | A1 | 11/2014 | Gopalakrishnan et al. | |
| 2018/0053147 | A1* | 2/2018 | Zhang | G06Q 10/087 |
| 2018/0186003 | A1* | 7/2018 | Chen | B25J 11/008 |
| 2019/0062056 | A1* | 2/2019 | Kurimoto | G06Q 10/08 |
| 2019/0287051 | A1* | 9/2019 | Heinla | G06Q 10/083 |
| 2019/0389657 | A1 | 12/2019 | Bonner et al. | |
| 2019/0389659 | A1* | 12/2019 | Grinnell | G06Q 10/087 |
| 2020/0223632 | A1* | 7/2020 | Melanson | B60P 3/00 |
| 2021/0239511 | A1 | 8/2021 | Yoshinaga | |
| 2021/0276802 | A1 | 9/2021 | Yoshinaga | |
| 2023/0174303 | A1* | 6/2023 | Ikawa | G06K 7/10376 |
| | | | | 700/215 |

FOREIGN PATENT DOCUMENTS

| CN | 110626701 | | 12/2019 | | |
|---|---|---|---|---|---|
| EP | 2892035 | | 7/2015 | | |
| JP | 107-015622 | U | 3/1995 | | |
| JP | 2000-142928 | | 5/2000 | | |
| JP | 2002-128230 | | 5/2002 | | |
| JP | 2002-284317 | | 10/2002 | | |
| JP | 2005-078099 | | 3/2005 | | |
| JP | 2006-076688 | | 3/2006 | | |
| JP | 2006-264942 | | 10/2006 | | |
| JP | 2007-153490 | | 6/2007 | | |
| JP | 2007-326653 | | 12/2007 | | |
| JP | 2015110481 | A | * 6/2015 | | |
| JP | 2016-004289 | | 1/2016 | | |
| JP | 2016-079027 | | 5/2016 | | |
| JP | 2019-068399 | | 4/2019 | | |
| KR | 10-2008-0039439 | | 5/2008 | | |
| WO | 2016/061255 | | 4/2016 | | |
| WO | 2019/235280 | | 12/2019 | | |
| WO | WO-2019236040 | A2 | * 12/2019 | | G06Q 30/06 |
| WO | 2020/004059 | | 1/2020 | | |

OTHER PUBLICATIONS

Chinese Office Action for 202180013972.2 mailed on Dec. 19, 2024.

Taiwanese Office Action for 110130447 mailed on Nov. 14, 2024.

Office Action dated Mar. 26, 2024 issued with respect to the corresponding Japanese Patent Application No. 2022-011741.

Extended European Search Report for 21861005.3 mailed on Jan. 31, 2024.

International Search Report for PCT/JP2021/026078 mailed on Sep. 21, 2021.

Japanese Office Action for 2020-143905 mailed on Sep. 7, 2021.

* cited by examiner

100

141
(140)  122A  150  160

142A
(140)

131A

130A

170

122B 142B
(140)

120

121

131B

130B

FORWARD

Figure 6:
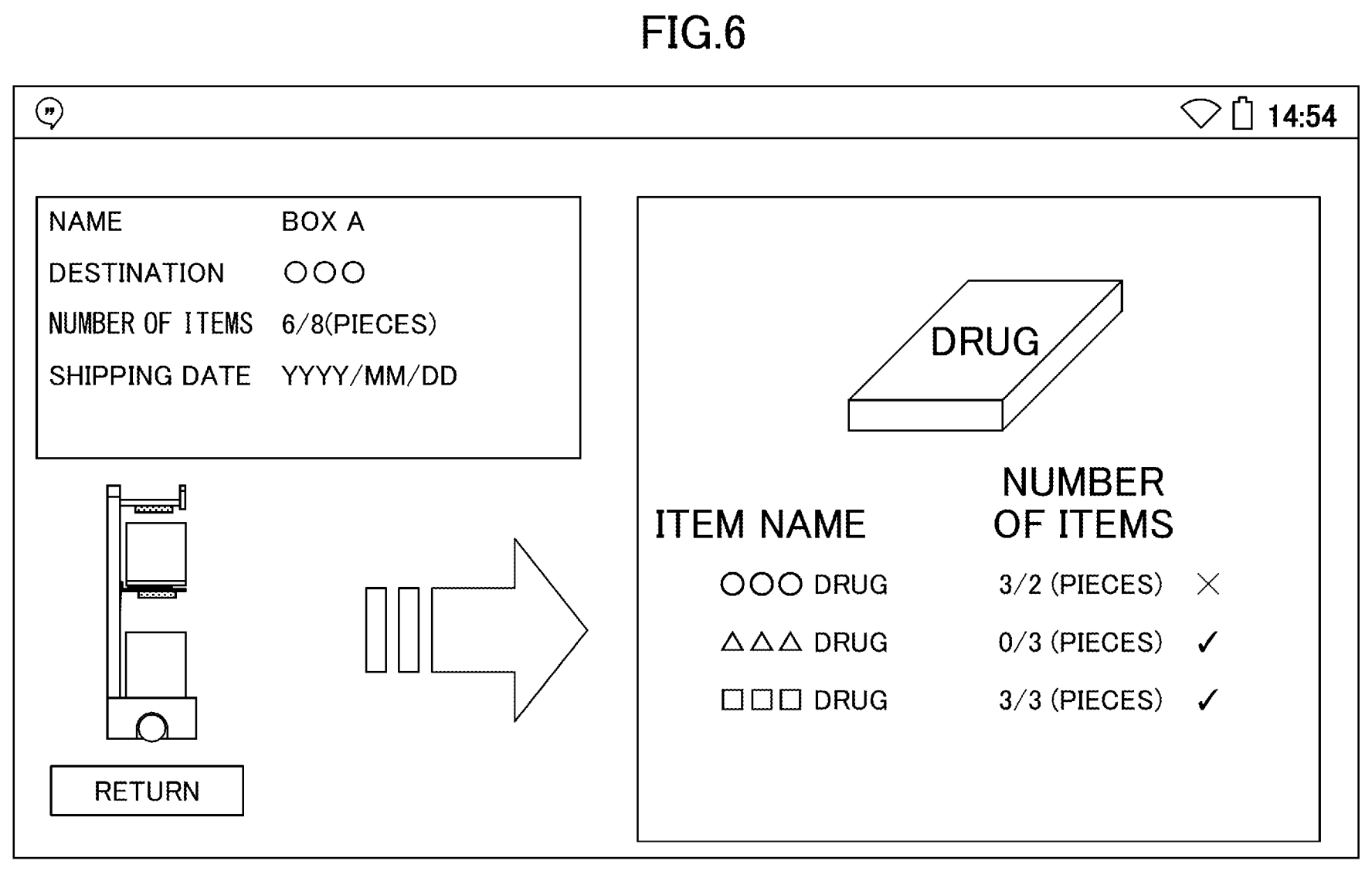

NAME          BOX A
DESTINATION   OOO
NUMBER OF ITEMS  6/8(PIECES)
SHIPPING DATE  YYYY/MM/DD

DRUG

| ITEM NAME | NUMBER OF ITEMS | |
|---|---|---|
| OOO DRUG | 3/2 (PIECES) | × |
| △△△ DRUG | 0/3 (PIECES) | ✓ |
| □□□ DRUG | 3/3 (PIECES) | ✓ |

RETURN

START
COUNTING PROCESS OF PICKING NUMBER

SPECIFY INSTRUCTED NUMBER — S21

COUNT NUMBER OF PRODUCTS HOUSED IN
PICKING CART BASED ON ID INFORMATION — S22

DETERMINE WHETHER OR
NOT EXCESSIVE OR INSUFFICIENT — S23

END
COUNTING PROCESS OF PICKING NUMBER

START
MAP CREATION PROCESS

GENERATE ROUTE — S31

SPECIFY NEXT PICKING LOCATION — S32

CREATE MAP — S33

END
MAP CREATION PROCESS

PICKING ASSISTANCE ROBOT AND PICKING ASSISTANCE SYSTEM

TECHNICAL FIELD

The present disclosure relates to a picking assistance robot and a picking assistance system.

BACKGROUND ART

Conventionally, when shipping products stored in a distribution center or the like according to an order, a picking operation in which a person selects and takes out the products to be shipped from among the products in the distribution center or the like is known. For example, Patent Document 1 discloses that a worker looks at a picking order displayed on a display provided on a picking trolley for picking.

RELATED-ART DOCUMENTS

Patent Documents

Patent Document 1: Japanese Unexamined Utility Model Application Publication No. 1995-15622

However, since the conventional picking trolleys are not self-propelled, the picking trolleys are required to be moved by the worker to the place where the work is desired to be performed. Therefore, the work cannot be performed efficiently.

SUMMARY OF THE INVENTION

Problem to be Solved by the Invention

Accordingly, it is an object of one embodiment of the present disclosure to provide a picking assistance robot and a picking assistance system capable of assisting a worker in efficiently picking products.

Means to Solve the Problem

<Clause 1> A picking assistance robot according to one aspect of an embodiment of the present disclosure includes a housing for housing a product to which an RFID tag is attached, an RFID reader including an antenna disposed at a position capable of reading the RFID tag when the product is housed in the housing, a terminal configured to receive a picking instruction, and a mobile body containing the housing and the RFID reader and configured to move to a location where the product is arranged based on location information of the product included in the picking instruction.

According to this aspect, the worker can concentrate on the picking operation of the product because the product is moved to the shelf on which the product included in the picking instruction is arranged. Thus, it is possible to provide a picking assistance robot capable of assisting the worker in efficiently picking products.

<Clause 2> In the picking assistance robot according to Clause 1, wherein the terminal, upon recognizing that the RFID tag is read by the RFID reader when the product is housed in the housing, may output a response tone indicating that the RFID tag is recognized or may display a response indication indicating that the RFID tag is recognized.

According to this aspect, the worker can check that the RFID tag has been read by the RFID reader by means of a response tone or a response indicator, and can proceed to the next step, resulting in improved work efficiency.

<Clause 3> The picking assistance robot according to Clause 2 may further include an authenticator that performs an authentication of a worker when the terminal recognizes that the RFID tag is read by the RFID reader when the product is housed in the housing.

According to this aspect, because the worker who put the product into the housing can be identified, the work amount and the work efficiency of the worker can be grasped.

<Clause 4> The picking assistance robot according to any one of Clauses 1 to 3, wherein the mobile body may wait without moving until an operation representing a completion of work with respect to the terminal is performed by a worker, after the RFID tag is read by the RFID reader when the product is housed in the housing.

According to this aspect, the picking assistance robot does not move until the worker has completed the operation, but can move when the worker has completed the operation. Therefore, the work can be improved by moving the picking assistance robot 100 according to the worker's intention.

<Clause 5> The picking assistance robot according to any one of Clauses 1 to 4, wherein the mobile body may move to a location, based on location information included in a moving instruction, when an operation representing a completion of work with respect to the terminal is performed by a worker after the RFID tag is read by the RFID reader when the product is housed in the housing.

According to this aspect, because the picking assistance robot can be moved when the worker has completed the operation, the work efficiency can be improved by moving the picking assistance robot 100 according to the worker's intention.

<Clause 6> The picking assistance robot according to Clause 5, wherein the moving instruction is an instruction of picking with respect to a product different from the product included in the picking instruction, and wherein the mobile body moves to a location where said product different from the product included in the picking instruction is arranged based on location information of said product.

According to this aspect, because the picking assistance robot can be moved to the shelf where the next product to be housed is arranged upon completion of the operation by the worker, the work efficiency can be improved by moving the picking assistance robot 100 according to the worker's intention.

<Clause 7> The picking assistance robot according to Clause 5, wherein a location included in the moving instruction may be a location where the product housed in the housing is to be taken out.

According to this aspect, the picking assistance robot can be moved to a location where the product housed in the housing is to be taken out when the worker has completed the operation. Accordingly, if another worker performs a taking out operation at the location where the product housed in the housing is to be taken out, the picking assistance robot can be moved between the worker who performs housing and the worker who performs taking out, and thus the work efficiency can be improved.

<Clause 8> The picking assistance robot according to Clause 7, wherein the mobile body moves to a location where the product is arranged, based on location information of the product included in another picking instruction, when the terminal reads the another picking instruction after the mobile body moves to the location where the product housed in the housing is taken out according to the moving instruction.

According to this aspect, because the product housed in the housing is taken out and then movement is to the location of the product included in another picking instruction, the picking assistance can be continuously performed and the work efficiency can be improved.

<Clause 9> The picking assistance robot according to any one of Clauses 1 to 8, wherein the antenna may be provided at an inlet of the housing.

According to this aspect, because the RFID tag attached to the product can be read reliably at the inlet of the housing, the probability of not being able to read the RFID tag can be reduced and the work efficiency can be improved by improving the reading accuracy.

<Clause 10> The picking assistance robot according to Clause 9, wherein the inlet of the housing may be located above the housing, and the antenna may be provided above the inlet.

According to this aspect, because the RFID tag attached to the product can be read more reliably at the antenna above the inlet of the housing, the probability of not being able to read the RFID tag can be further reduced and the work efficiency can be further improved by further improving the reading accuracy.

<Clause 11> The picking assistance robot according to any one of Clauses 1 to 10, wherein the housing is provided as a plurality of housings, the antenna is provided in each of the plurality of housings as a plurality of antennas, and the picking assistance robot further includes a shield between the plurality of housings such that regions capable of being read by the plurality of antennas are not overlapped.

According to this aspect, duplicate reading can be prevented between multiple housings, and multiple housings that can house more products can be used to significantly improve the work efficiency.

<Clause 12> In a picking assistance system that includes a server and the picking assistance robot as claimed in any one of Clauses 1 to 11, the picking assistance system according to one aspect of an embodiment of the present disclosure includes a picking instruction management unit configured to transmit a picking instruction, an ID information receiving unit configured to receive ID information written on an RFID tag attached to a product read by an RFID reader, a count unit configured to count a number of products housed in a housing based on the ID information, and a picking status management unit configured to transmit a picking status based on the number of the counted products.

According to this aspect, the worker can concentrate on the picking operation of the product because the product is moved to the shelf on which the product included in the picking instruction is arranged. Thus, it is possible to provide a picking assistance system including a picking assistance robot capable of assisting the worker in efficiently picking products.

<Clause 13> The picking assistance system according to Clause 12, wherein the count unit determines whether or not a number housed in the housing is excessive or insufficient with respect to a number instructed by the picking instruction, and the picking status management unit displays on a terminal one message, from among the following: the product is insufficient, picking is completed, and the product is excessive.

According to this aspect, the worker can easily distinguish between the product being insufficient, the picking being completed, and the product being excessive.

4

Effects of the Invention

According to an embodiment of the present disclosure, a picking assistance robot and a picking assistance system can be provided to enable the worker to pick products efficiently.

BRIEF DESCRIPTION OF THE DRAWINGS

FIG. 5 is an example of a display screen of an embodiment;

FIG. 6 is an example of a display screen of a tablet computer 150;

MODE FOR CARRYING OUT THE INVENTION

Hereinafter, embodiments of a picking assistance robot and the picking assistance system of the present disclosure will be described.

Figure 1:
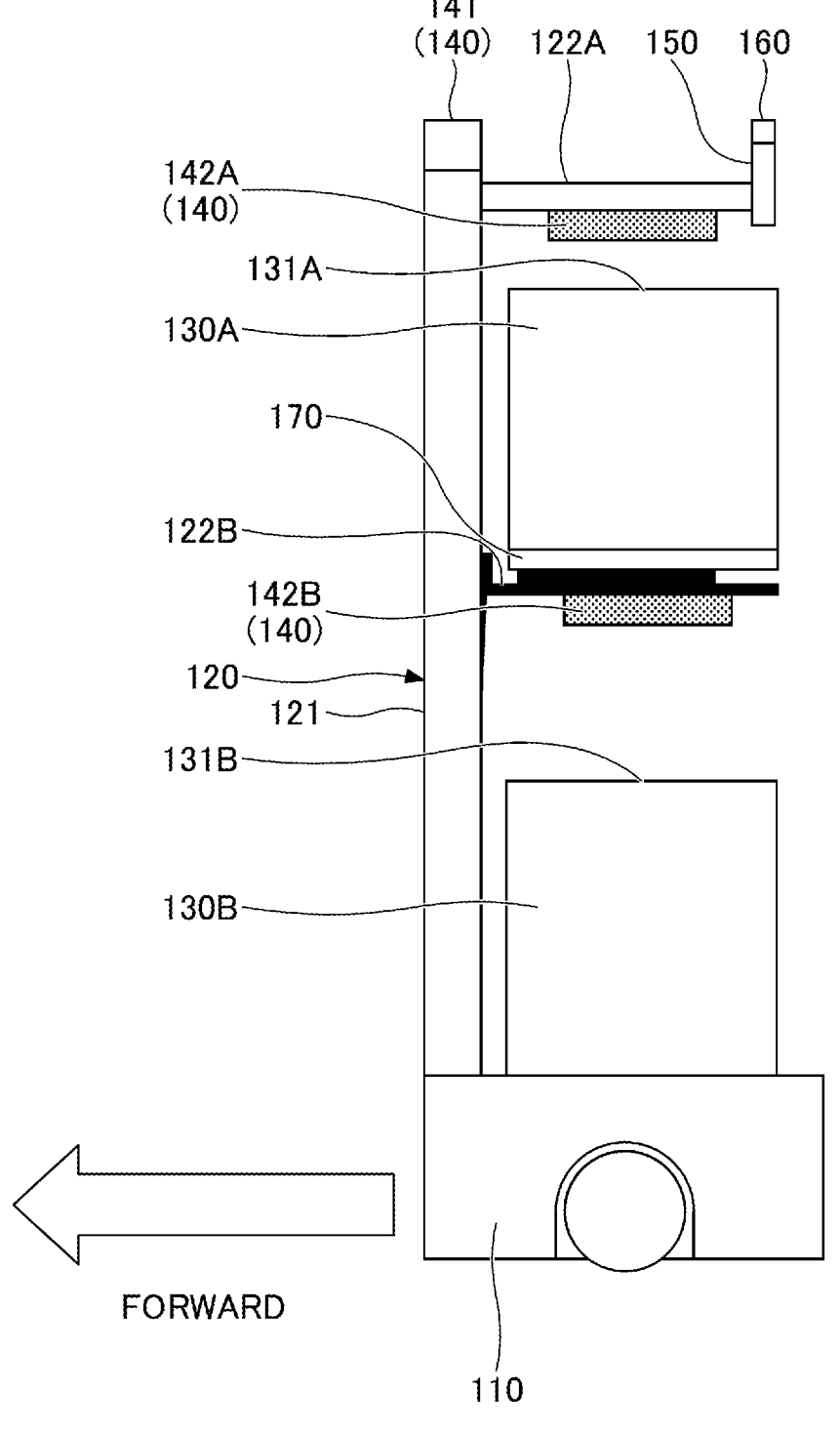
FIG. 1 is a side view illustrating a picking assistance robot 100 of an embodiment.

FIG. 1 is a side view illustrating a picking assistance robot 100 of an embodiment. The picking assistance robot 100 includes a conveyor vehicle 110, a frame 120, boxes 130A and 130B, a Radio Frequency Identifier (RFID) reader 140, a tablet computer 150, a face authenticator 160, and a shield 170.

As an example, the picking assistance robot 100 is used in a building such as a shop, a distribution center, or a warehouse, and is a robot (apparatus) that assists a worker in picking a product (selecting and picking out a product) while automatically traveling as a self-propelled conveyor vehicle 110. The left side indicated by an arrow in FIG. 1 is a front side of the picking assistance robot 100 and the right side in FIG. 1 is a rear side of the picking assistance robot 100. Hereinafter, the front and rear directions in the traveling direction of the picking assistance robot 100 will be referred to as a front-rear direction. The conveyor vehicle 110 can travel forward, right front, and left front.

Herein, the product may be various products or the like arranged on shelves or the like in a building, such as a store, a distribution center, a warehouse or the like, and may be various products or the like, such as clothes and daily necessities. Further, the product may also be a drug such as a swallowing drug, an injection drug, or an external therapeutic drug, a mask, or other medical clothing or equipment.

The conveyor vehicle 110 is an example of a mobile body and is realized by a so-called Automatic Guided Vehicle (AGV) as an example. The conveyor vehicle 110 includes a controller composed of a computer. The controller of the conveyor vehicle 110 can perform data communication with the tablet computer 150 via wired or wireless communication. The controller of the conveyor vehicle 110 moves the conveyor vehicle 110 to a predetermined location represented by location information transmitted from the tablet computer 150 according to an electronic map created for a path or the like between shelves or the like disposed in the building. The controller of the conveyor vehicle 110 transmits an arrival notification indicating arrival at the predetermined location to the tablet computer 150 upon completion of movement to the predetermined location represented by the location information. Hereinafter, a mode in which the conveyor vehicle 110 moves using the location information included in a picking instruction received from the management server by the tablet computer 150 will be described. However, the conveyor vehicle 110 may include a wireless communication function that enables direct wireless communication with the management server, and the location information may be obtained directly from the management server by wireless communication.

The frame 120 is mounted on the conveyor vehicle 110 and holds the boxes 130A and 130B, the RFID reader 140, the tablet computer 150, and the face authenticator 160. The frame 120 has a frame body 121 and stays 122A and 122B. The frame body 121 is, for example, an aluminum rod-shaped member, and iron stays 122A and 122B are attached as an example.

The stay 122A is attached to the upper end of the frame body 121 and extends to the rear. The stay 122A holds a main body 141 and an antenna 142A of the RFID reader 140, the tablet computer 150, and the face authenticator 160. More specifically, the main body 141 of the RFID reader 140 is attached to the top surface of the front end of the stay 122A, the antenna 142 is attached to the bottom surface of the center in the front-rear direction of the stay 122A, and the tablet computer 150 and face authenticator 160 are attached to the rear end of the stay 122A. The tablet computer 150 and the face authenticator 160 are attached toward the rear. This is to ensure the safety of workers using the picking assistance robot 100 because the picking assistance robot 100 does not travel backward. If the safety of the workers can be ensured with certainty, the picking assistance robot 100 may travel backward automatically or manually.

The stay 122B is attached in proximity to the middle of the frame body 121 in a vertical direction. Therefore, the stay 122B is located below the stay 122A. The box 130A is attached to the upper surface of the stay 122B and an antenna 142B of the RFID reader 140 is attached to the lower surface of the stay 122B.

The boxes 130A and 130B are an example of a housing in which a product picked by the worker is to be housed. The boxes 130A and 130B are, by way of example, rectangular boxes including inlets 131A and 131B having an open top surface. The inlets 131A and 131B are where the product always passes when the product is put into the boxes 130A and 130B. Here, a mode in which the worker takes out a product from the boxes 130A and 130B through the inlets 131A and 131B will be described. Therefore, the inlets 131A and 131B are the openings used as the inlets and outlets.

However, the boxes 130A and 130B may have a dedicated outlet that is used only for ejection.

The box 130A is attached to the top surface of the stay 122B as described above, and the box 130B is attached to the top surface of the conveyor vehicle 110. The box 130A is located in the upper row and the box 130B is located in the lower row. Here, a mode in which the box 130A is attached to the frame body 121 via the stay 122A and the box 130B is attached to the upper surface of the conveyor vehicle 110 will be described. However, the box 130A is only required to be located above the box 130B, and the boxes 130A and 130B may be attached in any form. Further, although the mode in which the picking assistance robot 100 includes two boxes 130A and 130B is described here, the number of boxes may be one, three, or more.

The RFID reader 140 has a main body 141 and antennas 142A and 142B. The antennas 142A and 142B have downward directivity. The main body 141 is connected to the antennas 142A and 142B and radiates radio waves from the antennas 142A and 142B at a frequency for reading an RFID tag and receives radio waves sent back by the RFID tag. The RFID tag, for example, is passive and does not include a battery. A unique product identifier (ID) is stored in a memory of an Integrated Circuit (IC) of each RFID tag. When each RFID tag receives radio waves from the RFID reader 140, the RFID tag is activated by the power of the received radio waves and radiates a signal including the unique product ID. The main body 141 reads the product ID included in the radio waves received by the antennas 142A and 142B and identifies each RFID tag.

The antenna 142A is located directly above the inlet 131A of the box 130A and is disposed at a position where the RFID tag attached to the product housed in the box 130A through the inlet 131A can be reliably read. The antenna 142B is located directly above the inlet 131B of the box 130B and is disposed at a position where the RFID tag attached to the product housed in the box 130B through the inlet 131B can be reliably read. By disposing the antennas 142A and 142B in this manner, the RFID tag attached to the products to be picked from the shelves and the like and housed in the boxes 130A and 130B can be reliably read by the worker, and thus reading omission (read-out) can be prevented. Therefore, a desired product can be correctly picked up by a desired number.

Further, for example, when a barcode is attached to the product and read by a barcode reader, the barcode is read one by one, and multiple barcodes cannot be read simultaneously. On the other hand, when the RFID tag is attached to the product, multiple RFID tags can be read simultaneously. Therefore, the multiple RFID tags attached to the multiple products can be collectively read by each of the antennas 142A and 142B. Accordingly, the worker can efficiently and quickly perform the picking operation in a short time.

Further, when the product has a metal package such as an aluminum film, reading radio waves radiated by the antennas 142A and 142B are blocked by the metal package of the product already housed in the boxes 130A and 130B. In this case, if the antennas 142A and 142B are provided below the boxes 130A and 130B, there is a possibility that the RFID tag of the product passing through the inlets 131A and 131B of the boxes 130A and 130B cannot be read. Further, when the product contains a liquid, a radiation distribution of the reading radio waves radiated by the antennas 142A and 142B changes due to the liquid of the product already housed in the boxes 130A and 130B. In this case, if the antennas 142A and 142B are provided below the boxes 130A and 130B, there is a possibility that the RFID tag of the product passing through the inlets 131A and 131B of the boxes 130A and 130E cannot be read.

On the other hand, in the present embodiment, the antennas 142A and 142B are located directly above the boxes 130A and 130B, respectively, so that the RFID tag of the product being put into the boxes 130A and 130B through the inlets 131A and 131B can be reliably read, even if the product has a metal package or the product contains a liquid. Further, an occurrence of the reading omission can be prevented.

The tablet computer 150 includes a display and a touch panel. The tablet computer 150 is a terminal that is operable by touching an image, such as a Graphic User Interface (GUI) displayed on the display. The tablet computer 150 receives the picking instruction and a picking status from the management server to display on the display and to transmit location information of the product included in the picking instruction to the controller of the conveyor vehicle 110. For example, the tablet computer 150 may use application software to display the picking instruction and to transmit the location information to the controller of the conveyor vehicle 110.

Further, the tablet computer 150 receives, from the RFID reader 140, product ID information read from the RFID tag by the RFID reader 140. The tablet computer 150 transmits the product ID information received from the RFID reader 140 to the management server. Further, the tablet computer 150 transmits information for identifying the worker obtained by the face authenticator 160 to the management server in association with the product ID information read from the RFID tag attached to the product housed in the boxes 130A and 130B. This is to grasp the work efficiency of each worker by enabling the management server to manage which worker has housed which product.

Although a mode in which the picking assistance robot 100 includes the tablet computer 150 is described here, any computer terminal such as a smartphone or a laptop personal computer may be used.

The face authenticator 160 obtains worker ID information for identifying the worker by performing the face authentication of the worker. As an example, a mode in which the picking assistance robot 100 includes the face authenticator 160 for grasping the work efficiency of each worker by the management server is described. However, instead of the face authenticator 160, an authenticator that identifies a body part of the worker by other methods may be used, or a reading device for reading an ID card or the like assigned to each worker may be used. Further, when the work efficiency or the like is not specifically managed, the picking assistance robot 100 is not required to include an authenticator for identifying a worker such as a face authenticator 160 or the like. Further, for example, even when only the picking assistance robot is touched, the information for identifying the worker obtained by the face authenticator 160 may be managed at the server, without being associated with the product ID information read from the RFID tag attached to the product housed in the boxes 130A and 130B.

A shield 170 is a conductor material that shields radio waves. The shield 170 is provided between the box 130A and the antenna 142B to prevent the antenna 142A from reading the RFID tag attached to the product housed in the box 130B. When the antenna 142B also has an upward directionality, the shield 170 may shield the antenna 142B so as not to read the RFID tag located on the upper side.

System Configuration

Figure 2:
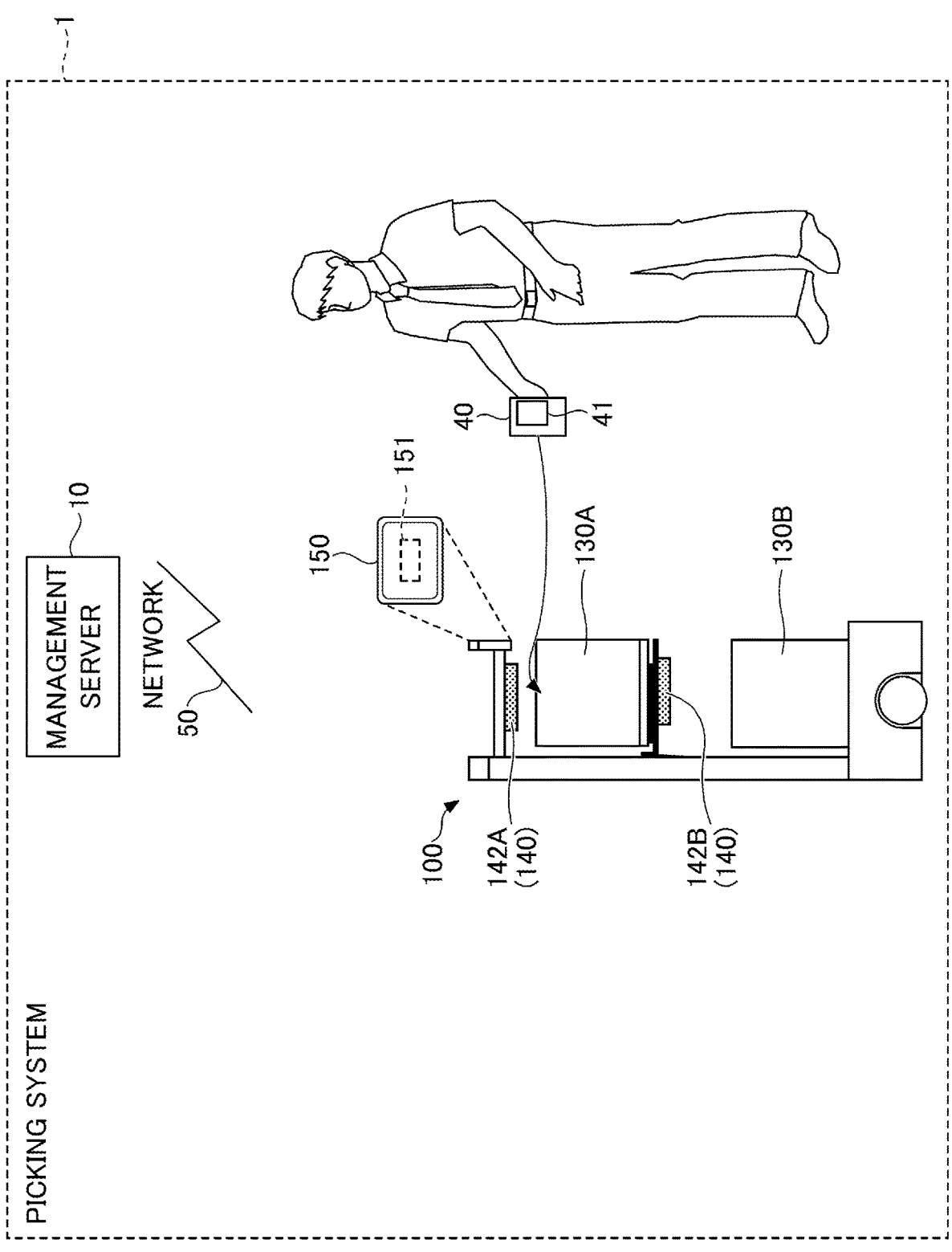
FIG. 2 is a schematic view of an entire configuration of the picking assistance system 1 according to an embodiment.

FIG. 2 is a schematic view of an entire configuration of a picking assistance system 1 according to an embodiment. As illustrated in FIG. 2, the picking assistance system 1 includes the management server 10 and the picking assistance robot 100. In FIG. 2, only the main components of the picking assistance robot 100 are illustrated, and the tablet computer 150 is enlarged to illustrate a controller 151. The controller 151 performs entire controls of the operation of the tablet computer 150 and includes a central processing unit (CPU) and a memory.

As an example, a worker who performs a picking operation puts a product 40 arranged on a shelf or the like in front of the picking assistance robot 100 into the box 130A or the box 130B, in a building, such as a store, a distribution center, a warehouse, or the like. Since each product 40 is provided with one RFID tag 41, when the product 40 is being put into the boxes 130A and 130B, a product ID of the RFID tag 41 attached to the product 40 is read by the antennas 142A and 142B.

The management server 10 transmits a picking instruction to the tablet computer 150. The picking instructions may include information on the location where the picking assistance robot 100 is to move, the product 40 to be put into the box 130A or the box 130B by the worker, and the number of the products 40 to be put into the box 130A or the box 130B by the worker. The location where the picking assistance robot 100 is to move is the location at which the product 40 is arranged or stored. The management server 10 transmits a picking status to the tablet computer 150. The picking status may include information related to the number of products 40 already in the box 130A or the box 130B. Specifically, the management server 10 counts the number of products 40 in the box 130A or the box 130E based on the product ID information read from the RFID tag 41 by the RFID reader 140.

The management server 10 is comprised of one or more computers. The management server 10 may transmit and receive data to and from the tablet computer 150 via any network 50. Details of the management server 10 will be described below.

The tablet computer 150 receives the picking instruction and the picking status from the management server 10, displays the picking instruction and the picking status on the display, and transmits the location information included in the picking instruction to the controller of the conveyor vehicle 110. The conveyor vehicle 110 moves to a location represented by the location information. For example, the tablet computer 150 may use application software to display the picking instruction and to transmit the location information included in the picking instruction to the controller of the conveyor vehicle 110. The worker walks to the location where the picking assistance robot 100 is located, checks the type of the product 40, the location of the shelf, or the like displayed on the tablet computer 150, and picks the product 40 to put into the boxes 130A and 130B.

The RFID reader 140 reads the product ID information written to the RFID tag 41. The RFID reader 140 transmits the product ID information read from the RFID tag 41 to the tablet computer 150.

Further, the tablet computer 150 receives the product ID information from the RFID reader 140. The tablet computer 150 transmits the product ID information received from the RFID reader 140 to the management server 10. Further, the tablet computer 150 receives the product ID information and outputs a response sound indicating that the product 40 is a correct product 40 upon determining the product 40 to be the correct product 40 according to the picking instruction. On the other hand, the tablet computer 150 receives the product ID information and outputs a response sound indicating that the product 40 is not the correct product 40 if the tablet computer determines that the product 40 is not the correct product 40 according to the picking instruction. The worker can check whether the picking operation he/she is performing is correct by the response sound. Note that the tablet computer 150 may display, instead of or in addition to the response sound, a response indication representing whether the product is the correct product 40 or is not the correct product 40.

The picking assistance robot 100 includes the tablet computer 150 and the RFID reader 140. Here, an example in which, the picking assistance robot 100 includes two boxes 130A and 130B, the RFID reader 140 includes two antennas 142A and 142B, and the antennas 142A and 142B are disposed in the boxes 130A and 130B, respectively, will be described. The worker may put the picked product 40 into either of the two boxes 130A and 130B. For example, the worker may put the picked product into either of the two boxes 130A and 130B depending on the shipping destination or the like. Further, when there are two shipping destinations or the like, the two boxes 130A and 130B may be used separately for the two shipping destinations.

As described above, the product 40 is various products or the like arranged on shelves or the like in a building, such as a store, a distribution center, a warehouse, or the like. The RFID tag 41 is attached to the product 40. The RFID tag 41 includes an IC chip that includes a memory in which the product ID information is written. One RFID tag 41 is attached to each product 40. Attaching the RFID tag 41 to the product 40 means attaching the RFID tag 41 to the product 40, e.g., the RFID tag 41 is attached to the product 40, sewn, or fixed with a strap or the like.

When the product 40 arrives at the distribution center or the like, the management server 10 manages the product ID information written on the RFID tag 41 and the information of the product 40 to which the RFID tag 41 is attached in association with each other. Further, the management server 10 manages information indicating which of the boxes 130A and 130B of the picking assistance robot 100 is the box housing the RFID reader 140.

Entire Process

Figure 3:
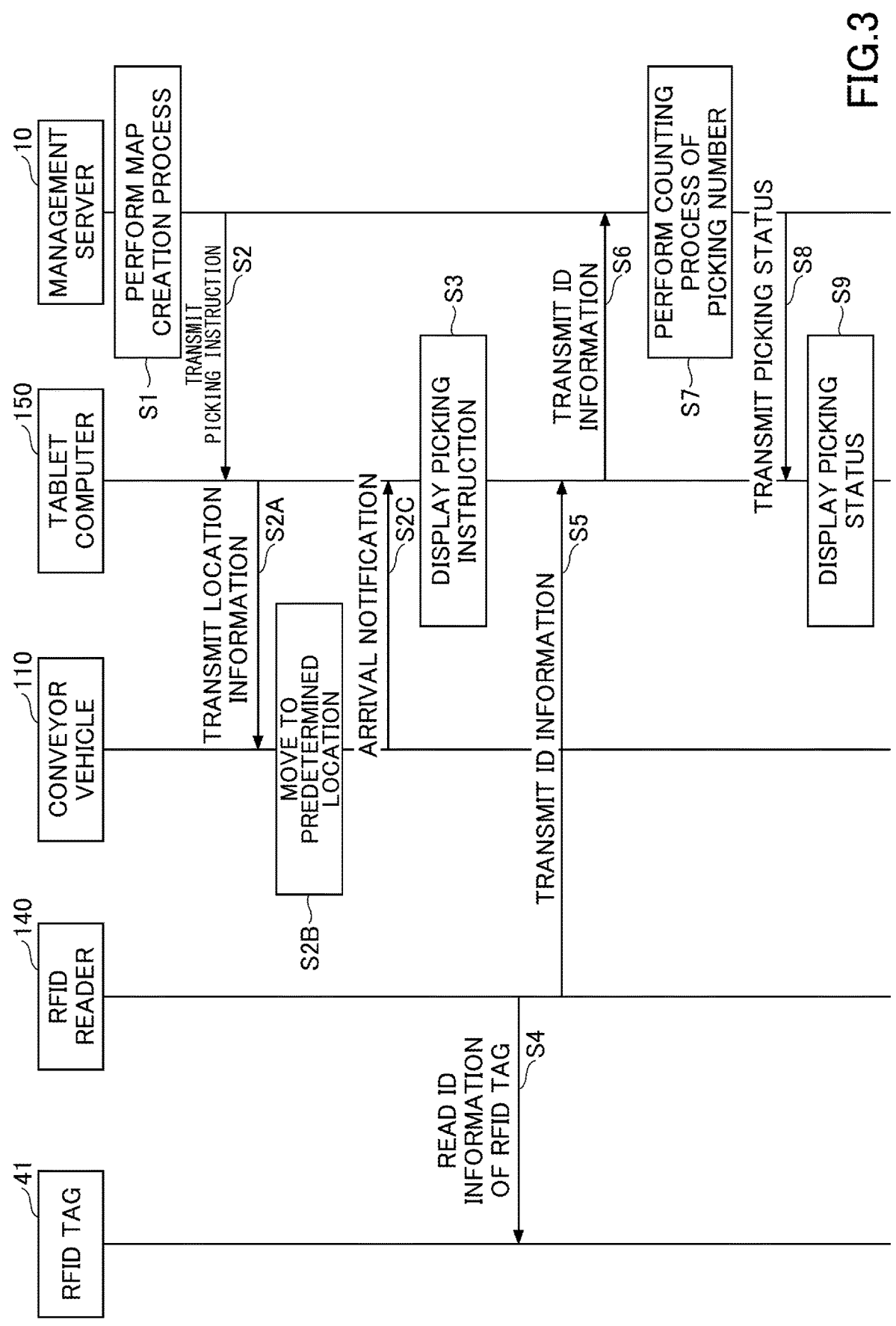
FIG. 3 is a sequence diagram illustrating an entire process of the picking assistance system 1 according to an embodiment.

FIG. 3 is a sequence diagram illustrating the entire process of the picking assistance system 1 of the embodiment.

The management server 10 creates a map for guiding the picking assistance robot 100 (step S1).

The management server 10 transmits data of the picking instruction to the tablet computer 150 (step S2). As described above, the picking instructions may include information on the location where the picking assistance robot 100 is to move (the location at which the product 40 is stored), the product 40 to be put into the box 130A or the box 130B by the worker at that location, and the number of the products 40 to be put into the box 130A or the box 130B by the worker.

The tablet computer 150 transmits the location information included in the picking instruction received from the management server 10 to the controller of the conveyor vehicle 110 (step S2A).

The conveyor vehicle 110 moves to a predetermined location included in the picking instruction (step S2B). The predetermined location indicates a location of the shelf or the like in which the product 40 included in the picking instruction is arranged. Upon processing of step S2B, the picking assistance robot 100 moves in front of the shelf or the like in which the product 40 included in the picking instruction is arranged.

When the movement to the predetermined location included in the picking instruction is completed, the controller of the conveyor vehicle 110 notifies the tablet computer 150 that the picking assistance robot 100 has arrived at the predetermined location (step S2C). The picking assistance robot 100 waits at the predetermined location until a next instruction for movement is received. That is, the picking assistance robot 100 will wait in front of the shelf or the like in which the product 40 included in the picking instruction is arranged until the worker's picking operation is completed. The worker can recognize that the place where the picking assistance robot 100 is waiting around the worker is the place where the picking operation is to be performed.

When the tablet computer 150 receives the notification from the controller of the conveyor vehicle 110 in step S2C indicating that the picking assistance robot 100 has arrived at the predetermined location, the tablet computer 150 displays the picking instruction received from the management server 10 in step S2 on the display (step S3). The worker can walk to the place where the picking assistance robot 100 is waiting and perform the picking operation while looking at the picking instruction displayed on the tablet computer 150 of the picking assistance robot 100.

The RFID reader 140 reads the product ID information written on the RFID tag 41 on each product 40 put into the box 130A or the box 130B by the worker (step S4). The RFID reader 140 reads the RFID tag 41 attached to the product 40 passing through the inlets 131A and 131B of the boxes 130A and 130B by using the antennas 142A and 142B. The process of step S4 allows the worker to obtain the product ID of the RFID tag 41 attached to the product 40 placed in the boxes 130A and 130B.

The RFID reader 140 transmits the product ID information read in step S4 and the information for identifying the RFID reader 140 to the tablet computer 150 (step S5).

The tablet computer 150 transmits the product ID information and the information for identifying the RFID reader 140 received in step S5 to the management server 10 (step S6).

The management server 10 counts the number of each product 40 included in the box 130A or the box 130B based on the product ID information received in step S6 (step S7).

The management server 10 transmits the data of the picking status to the tablet computer 150 based on the number of each product 40 counted in step S7 (step S8). As described above, the picking status may include information on the number of products 40 already included in the box 130A or the box 130B.

The tablet computer 150 displays the picking status received in step S8 on the display (step S9). The worker can determine whether a product 40 should be further housed in the boxes 130A and 130B while looking at the picking status as described above.

Functional Block

Figure 4:
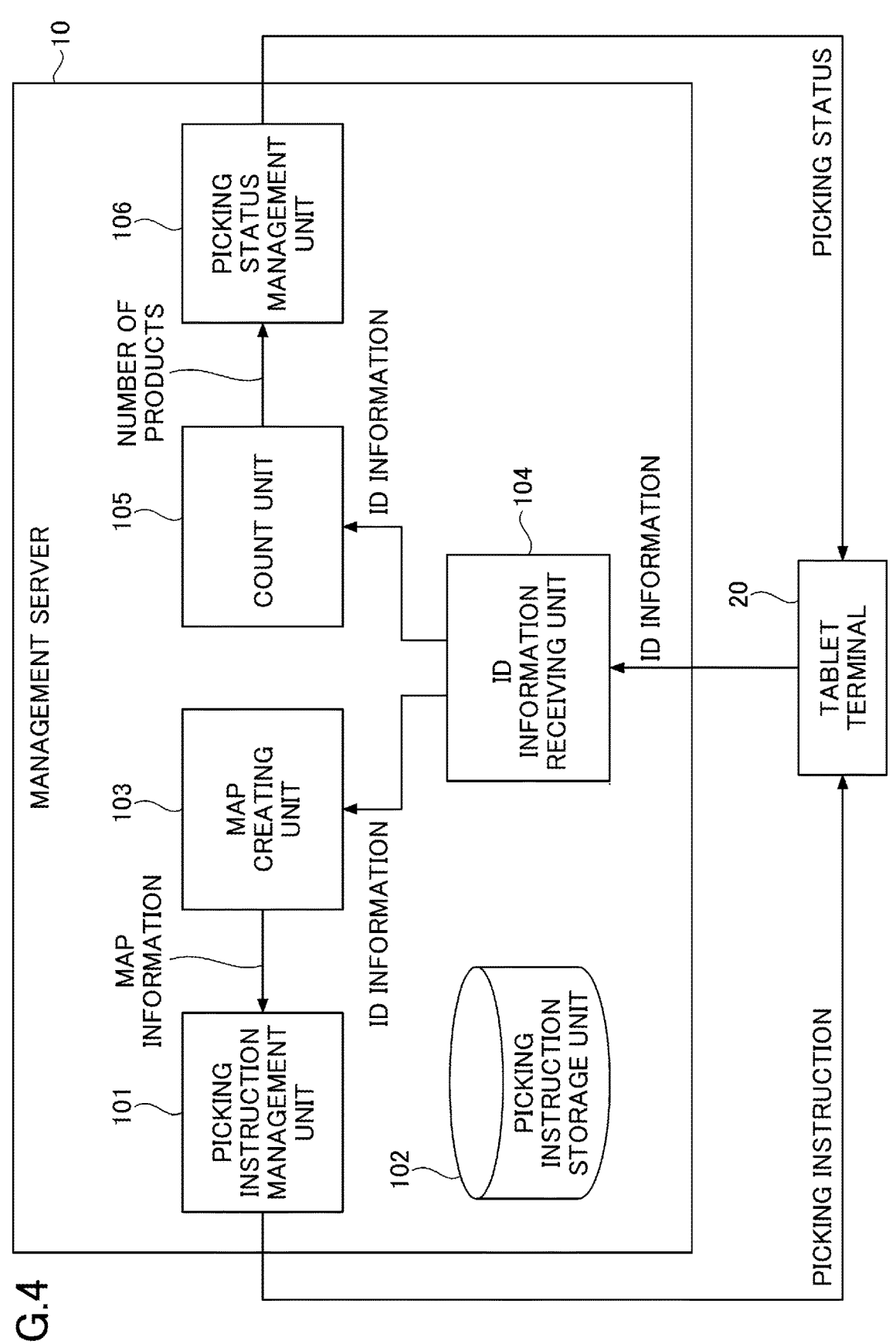
FIG. 4 is a functional block diagram of a management server 10.

FIG. 4 is a functional block diagram of the management server 10. As illustrated in FIG. 4, the management server 10 may include a picking instruction management unit 101, a picking instruction storage unit 102, a map creating unit 103, an ID information receiving unit 104, a count unit 105, and a picking status management unit 106. The management server 10 can function as the picking instruction management unit 101, the map creating unit 103, the ID information receiving unit 104, the count unit 105, and the picking status management unit 106 by executing a program. Each of them will be described below.

The tablet computer 150 may have a part of or all of the functions of the management server 10. For example, the tablet computer 150 may include a means for receiving a picking instruction (also referred to as a picking instruction receiving unit), the ID information receiving unit 104, the count unit 105, and the picking status management unit 106.

The picking instruction management unit 101 transmits the data of the picking instruction to the tablet computer 150. For example, in response to a worker tapping a screen for starting the picking operation displayed on the tablet computer 150, the picking instruction management unit 101 starts transmitting the data of the picking instruction. As described above, the picking instruction may include information of the location where the picking assistance robot 100 is to move (the location at which the product 40 is stored), the product 40 to be put into the box 130A or the box 130B by the worker at that location, and the number of the products 40 to be put into the box 130A or the box 130B by the worker. The picking instruction management unit 101 stores the data of the picking instruction in the picking instruction storage unit 102.

The picking instruction storage unit 102 stores the data of the picking instruction transmitted to the tablet computer 150.

Hereinafter, a screen illustrating the picking instruction displayed on the tablet computer 150 will be described with reference to FIG. 5.

Figure 5:
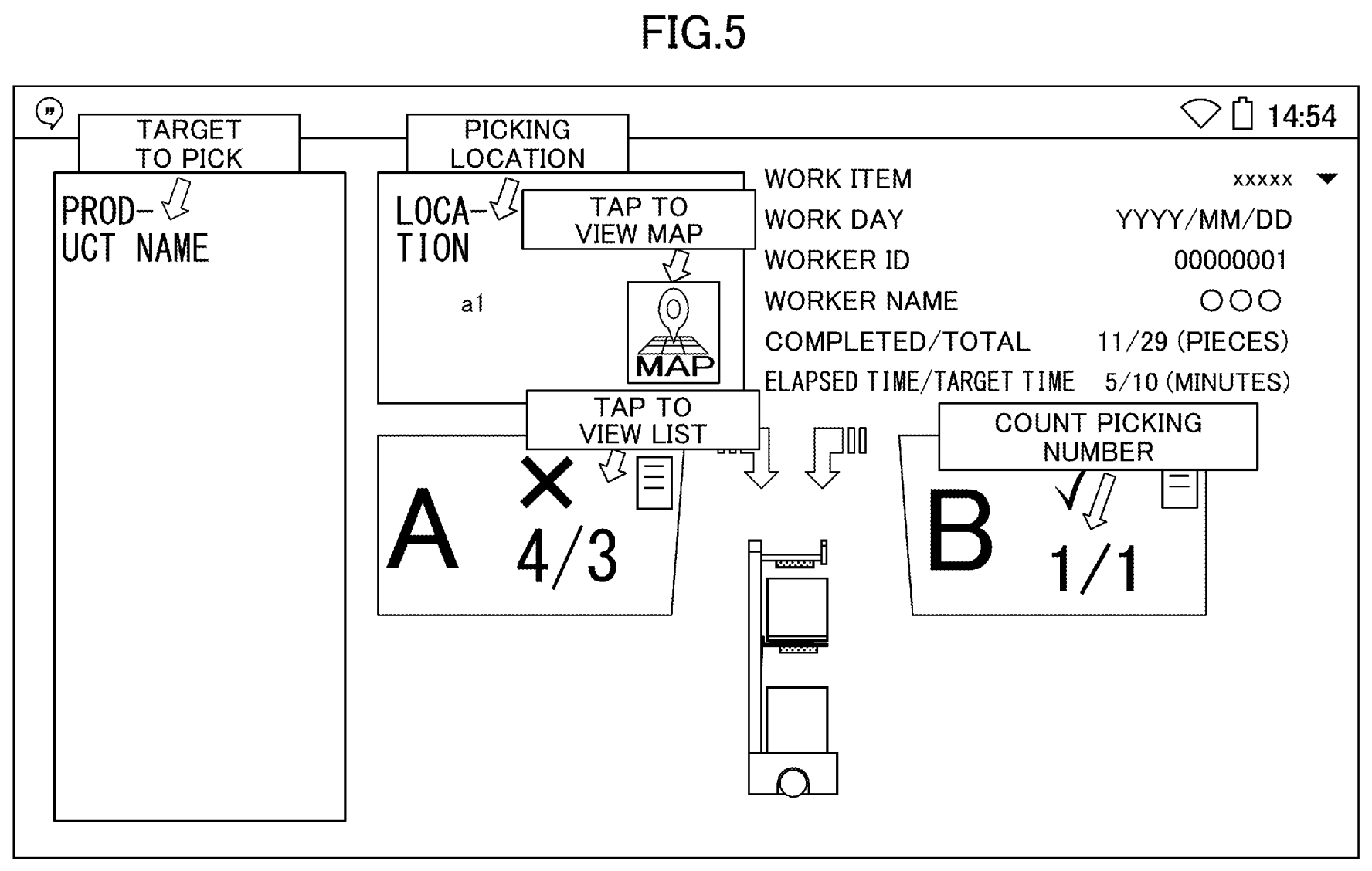

FIG. 5 is an example of a display screen of the embodiment. In the screen illustrated in FIG. 5, the boxes 130A and 130B are designated A and B. As illustrated in FIG. 5, the location where the picking assistance robot 100 is to move (also referred to as the "picking location" or the location of shelves or the like at which the product 40 is stored) may be displayed. Further, as illustrated in FIG. 5, as the picking instruction, a name or an image of the product 40 to be put into the box 130A or the box 130B (to be picked) at that location by the worker (for example, an image of the product 40 when stored at the distribution center or the like) may be displayed. Further, as illustrated in FIG. 5, as the picking instruction, the number of the products 40 to be put into the box 130A or the box 130B by the worker (in the example of FIG. 5, the numbers to be put into the boxes 130A and 130B) may be displayed. Further, as illustrated in FIG. 5, the date on which the picking operation is performed (i.e., the work day), the identifier for the worker (i.e., the worker ID), the name of the worker (i.e., the worker name), the number of the total number of the products 40 to be picked (i.e., the number of completed items/the total number of items), the elapsed time of the target time to complete picking (i.e., the elapsed time/the target time), and the like may be displayed. The worker can grasp how many products 40 are required to be picked at which place by looking at the screen as illustrated in FIG. 5. When it is specified whether the product 40 should be put into the box 130A or the box 130B depending on the product 40, the worker can immediately grasp misplacement in the box 130A or the box 130B that is different from the instruction by looking at the screen as illustrated in FIG. 5.

With respect to each box 130A and 130B, a list representing one or more products 40 that the worker should put into the boxes 130A and 130B, and a list representing the number of each product 40 that the worker should put into the boxes 130A and 130B may be displayed. Hereinafter, a screen illustrating the picking instructions for each box 130A and 130B displayed on the tablet computer 150 will be described with reference to FIG. 6.

FIG. 6 is an example of a display screen of the tablet computer 150. As an example, FIG. 6 illustrates a display for the product 40 to be put into the box 130A. For example, when the screen of FIG. 5 is tapped, transition may be made to the screen of FIG. 6. As illustrated in FIG. 6, one or more products 40 to be put into the box 130A by the worker may be displayed. Further, as illustrated in FIG. 6, the number of each product 40 to be put into the box 130A by the worker may be displayed. Further, as illustrated in FIG. 6, the destination to which the product 40 is shipped (shipping destination), the total number of the products 40 to be put into the box 130A (number of items), date of shipment, or the like may be displayed. The worker can grasp how many products 40 are required to be picked for each of the boxes 130A and 130B by looking at the screen as illustrated in FIG. 6.

Returning to FIG. 4, the ID information receiving unit 104 receives from the tablet computer 150 the product ID information read from the RFID tag 41 and the information for identifying the RFID reader 140. When the ID information receiving unit 104 receives the product ID information and the information for identifying the RFID reader 140, the ID information receiving unit 104 notifies the map creating unit 103 and the count unit 105.

The map creating unit 103 performs a map creation process. Specifically, the map creating unit 103 creates a map for guiding the picking assistance robot 100. Hereinafter, the map creation at the start of the picking operation and the map creation during the picking operation will be described separately.

At Start of Picking Operation

The map creating unit 103 generates a shortest distance route (path) through all the places where the product 40 instructed to be put into the box 130A or the box 130B is stored. The map creating unit 103 creates a map that clearly represents the generated route, the next picking location (that is, the picking location where the picking assistance robot 100 is to be directed next), and all of the picking locations on the layout diagram of the shelves in the distribution center. The picking assistance robot 100 moves to each picking location according to the location information included in the picking instruction received from the management server 10 by the tablet computer 150 and the map created by the map creating unit 103.

During Picking Operation

The map creating unit 103 creates a map that clearly represents the route generated at the start of the picking operation, the next picking location (that is, the next picking location from the picking location where the picking has been completed), and all of the picking locations on the layout diagram of the shelves in the distribution center. The map creating unit 103 may regenerate a new route without using the route generated at the start of the picking operation.

If a plurality of picking assistance robots 100 are provided, both at the start of the picking operation and during the picking operation, the map creating unit 103 may generate a route so that the plurality of picking assistance robots 100 do not collide (for example, the plurality of picking assistance robots 100 do not go through the same path in the same direction or in the opposite direction simultaneously or within a predetermined time) based on the picking status of the plurality of picking assistance robots 100. Further, the present location or route (path) of the plurality of picking assistance robots 100 may be clearly represented on the map. The map creating unit 103 can generate a route (path) that avoids a shelve being crowded by other picking assistance robots 100.

Hereinafter, a screen illustrating a map displayed on the tablet computer 150 will be described with reference to FIG. 7.

Figure 7:
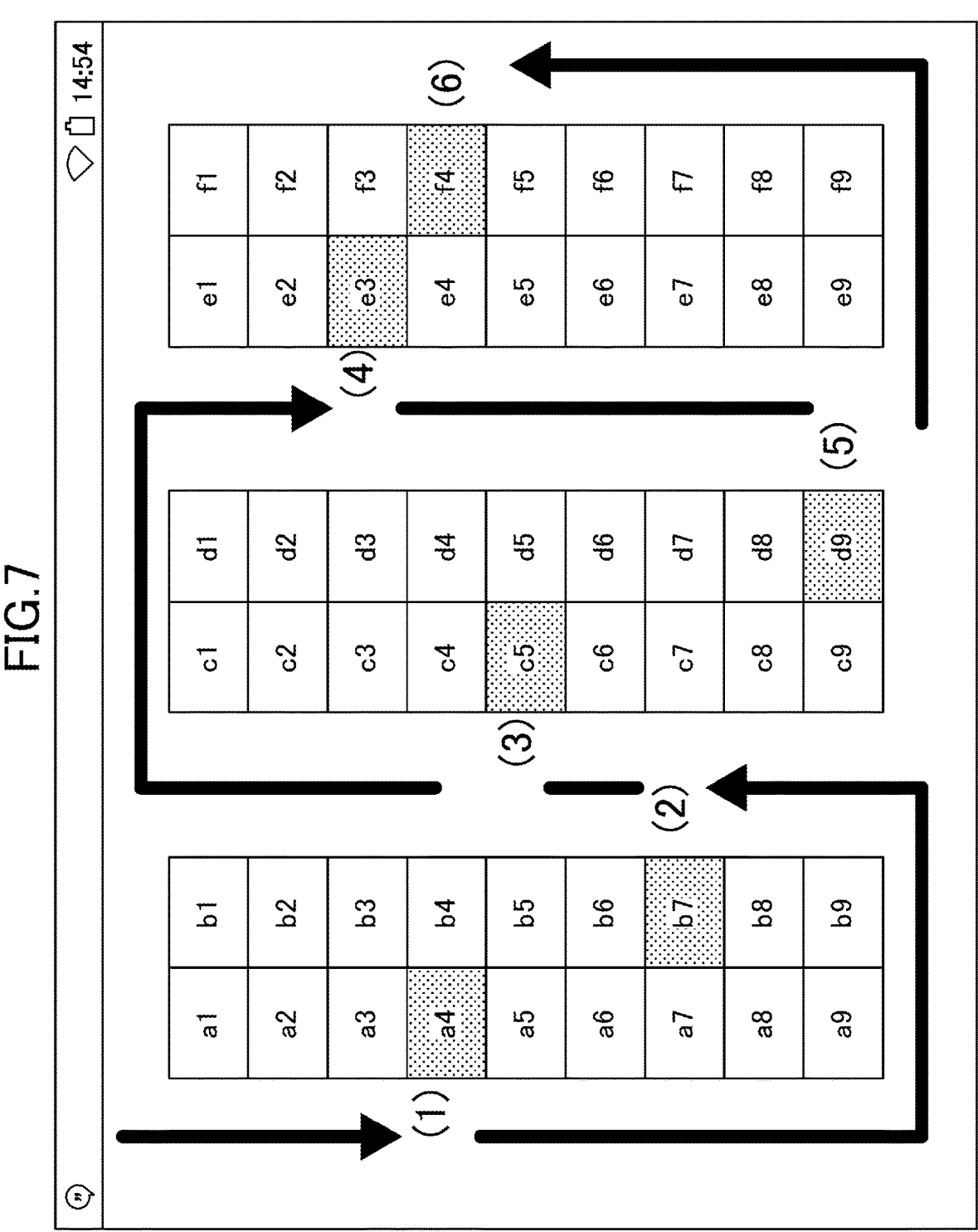
FIG. 7 is an example of a display screen of an embodiment.

FIG. 7 is an example of a display screen of the embodiment. For example, when the screen of FIG. 5 is tapped, transition may be made to the screen of FIG. 7. As illustrated in FIG. 7, a map that clearly represents a route, a next picking location, and all picking locations may be displayed on the layout diagram of the shelves in the distribution center or the like.

Returning to FIG. 4, the count unit 105 performs a picking number counting process. Specifically, the count unit 105 identifies the number of each product 40 instructed to the worker to be put into the box 130A or the box 130B with reference to the picking instruction stored in the picking instruction storage unit 102. The count unit 105 counts the number of each product 40 stored in the box 130A or the box 130B based on the product ID information received from the ID information receiving unit 104. Specifically, when the count unit 105 receives the product ID information from the ID information receiving unit 104, the count unit 105 determines that the product 40 with the RFID tag 41 in which the product ID information is written is put into the box 130A or the box 130B. Further, the count unit 105 determines whether or not the number of each product 40 already in the box 130A or the box 130B is excessive or insufficient with respect to the number of each product 40 instructed to the worker to be put into the box 130A or the box 130B based on the instructed number and the counted number. Specifically, the count unit 105 determines that the product 40 is insufficient when the instructed number is larger than the counted number. The count unit 105 determines that the picking is completed when the instructed number is same as the counted number. The count unit 105 determines that the product 40 is excessive when the instructed number is smaller than the counted number.

The count unit 105 can determine whether the product 40 is stored in the box 130A or the box 130B based on the product ID information, the information for identifying the RFID reader 140, and information indicating whether the RFID reader 140 has read the product ID information with the antenna 142A or the antenna 142B.

The picking status management unit 106 transmits the picking status data to the tablet computer 150 based on the number of each product 40 counted by the count unit 105. As described above, the picking status may include information on the number of products 40 already in the box 130A or the box 130B. Hereinafter, a display of the picking status on the screen illustrating the picking instruction will be described with reference to FIG. 5 and FIG. 6.

As illustrated in FIG. 5, as a picking instruction, the number of products 40 to be put into the box 130A or the box 130B by the worker may be displayed (see the denominator of the fractions). The number of products 40 already put into the box 130A or the box 130B by the worker (see the numerator of the fractions) may be displayed, together with the number of products 40 to be put into the box 130A or the box 130B. Further, whether or not the number already in the box 130A or the box 130B is excessive or insufficient with respect to the number instructed to the worker to be put into the box 130A or the box 130B may be displayed. For example, the worker can easily recognize that the product 40 is insufficient, the picking is complete, or the product 40 is excessive. For example, when the product 40 is insufficient, no mark may be displayed, when the picking is complete, a check mark may be displayed, and when the product 40 is excessive, an "X" mark may be displayed.

As illustrated in FIG. 6, the number of one or more products 40 to be put into the box 130A by the worker may be displayed. The number of each product 40 already put into the box 130A or the box 1303 by the worker may be displayed, together with the number of products 40 to be put into the box 130A or the box 130B. Further, whether or not the number already in the box 130A is excessive or insufficient with respect to the number instructed to the worker to be put into the box 130A may be displayed. For example, the worker can easily recognize that the product 40 is insufficient, the picking is complete or the product 40 is excessive. For example, when the product 40 is insufficient, no mark may be displayed, when the picking is complete, a check mark may be displayed, and when the product 40 is excessive, an "X" mark may be displayed. It should be noted that such a display can be similarly displayed for the box 130B.

Figure 8:
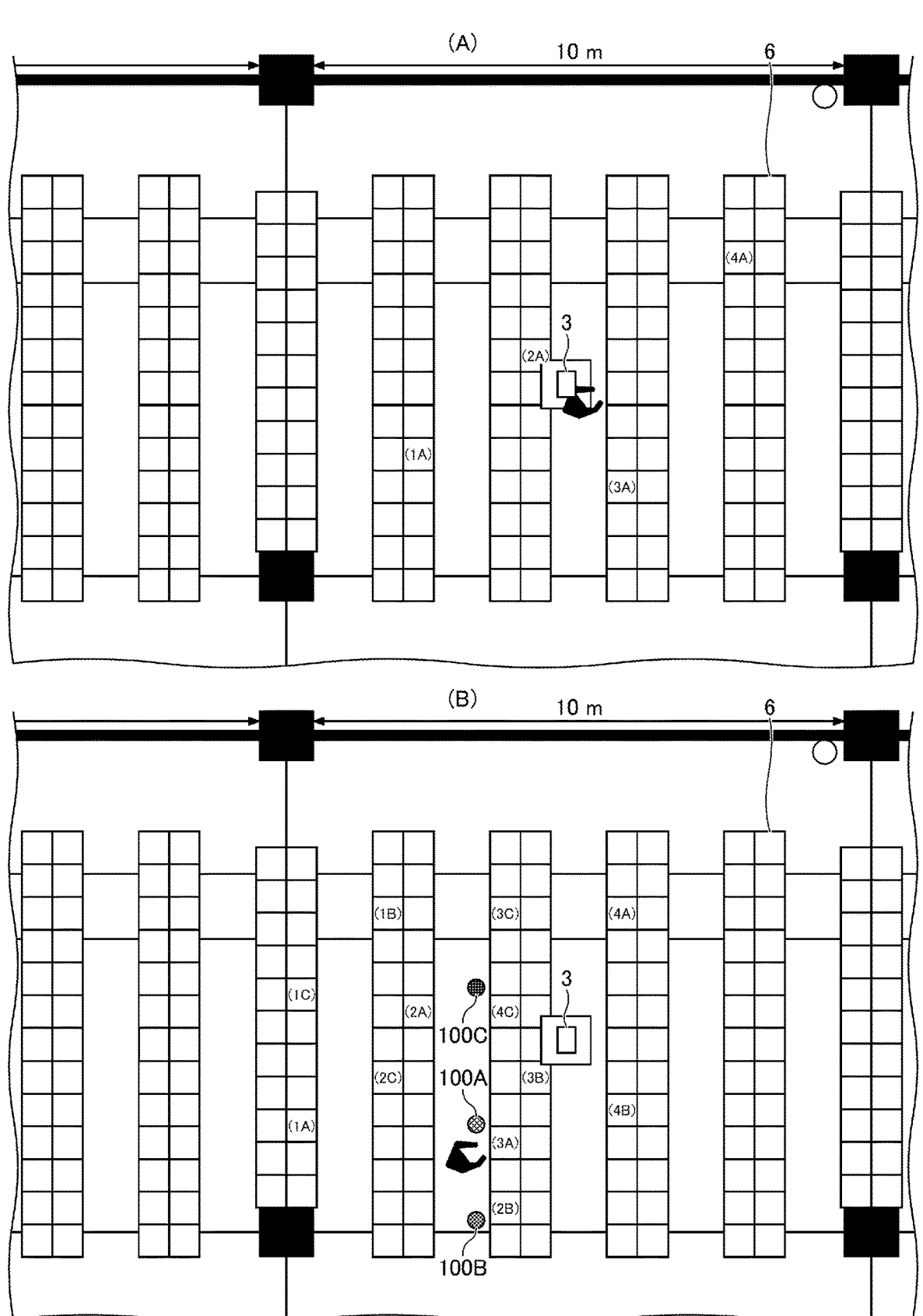
FIG. 8 is a diagram illustrating a work efficiency of the picking assistance robot 100.

FIG. 8 is a diagram illustrating a work efficiency of the picking assistance robot 100. For example, when picking is performed using a hand-push type cart as illustrated in (A) of FIG. 8, the worker searches a shelf 6 on which the products 40 of (1) to (4) are arranged while pushing the cart.

On the other hand, (B) of FIG. 8 illustrates how three picking assistance robots 100A to 100C are used to pick products 40 of (1A) to (4A) with a picking assistance robot 100A, pick products 40 of (1B) to (4B) with a picking assistance robot 100B, and pick products 40 of (1C) to (4C) with a picking assistance robot 100C. The picking assistance robots 100A to 100C are the same as the picking assistance robot 100 illustrated in FIG. 1.

As an example, the picking assistance robots 100A to 100C are located on the same path. Since the picking assistance robots 100A to 100C are waiting in a location in front of the shelf represented by the location information included in the picking instruction, the worker may walk to the location of the picking assistance robots 100A to 100C and pick products 40 included in the picking instruction while looking at the display of the tablet computer 150. Since the picking assistance robot (either 100A to 100C) for which the completion operation was performed automatically moves according to the following picking instruction and waits in front of the shelf, the worker may approach to the moved picking assistance robot (either 100A to 100C) and perform the picking operation. Therefore, if the picking assistance robot 100 is used, the efficiency of the picking operation can be significantly improved. In particular, if a plurality of picking assistance robots 100 are used, the work efficiency can be further improved.

Figure 9:
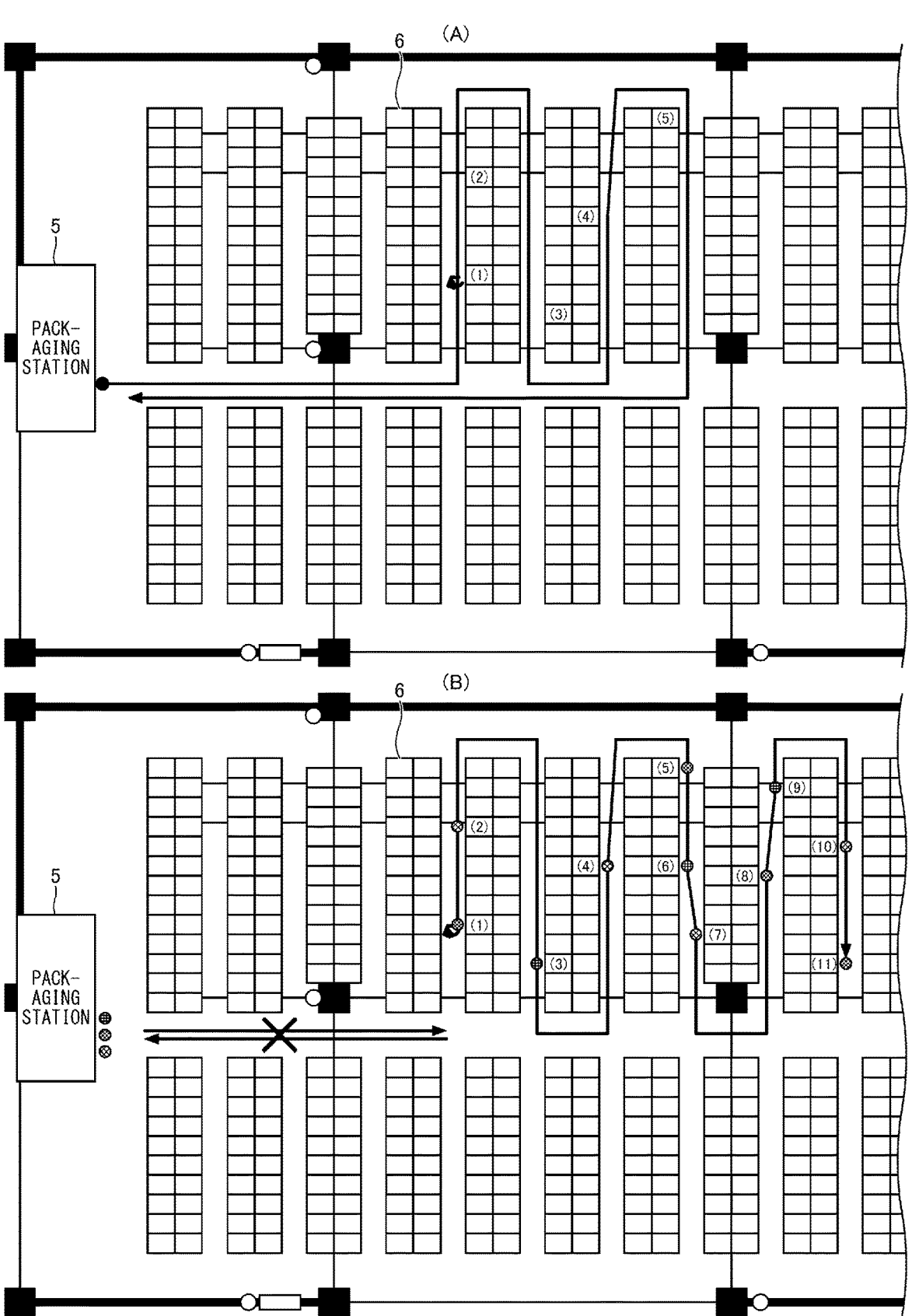
FIG. 9 is a diagram illustrating a work efficiency of the picking assistance robot 100.

FIG. 9 is a diagram illustrating a work efficiency of the picking assistance robot 100. When picking is performed using a hand-push type cart as illustrated in (A) of FIG. 9, the worker goes around the area where the shelf 6 is located while pushing the cart from a packaging station 5 to perform picking.

The worker will return to the packaging station 5 whenever the cart is full of products 40. The packaging station 5 is where the product 40 is taken out of the cart.

On the other hand, as illustrated in (B) of FIG. 9, if the picking assistance robot 100 is configured to automatically go and return between the packaging station 5 and the area where the shelf 6 is located, the worker can concentrate on the picking operation in the area where the shelf 6 is located and is not required to return to the packaging station 5. If a person who takes out the product 40 from the picking assistance robot 100 is assigned to the packaging station 5, the picking assistance robot 100 can return to the area where the shelve 6 is located with the boxes 130A and 130B empty and can wait in the location included in the picking instruction. This significantly improves the work efficiency.

Figure 10:
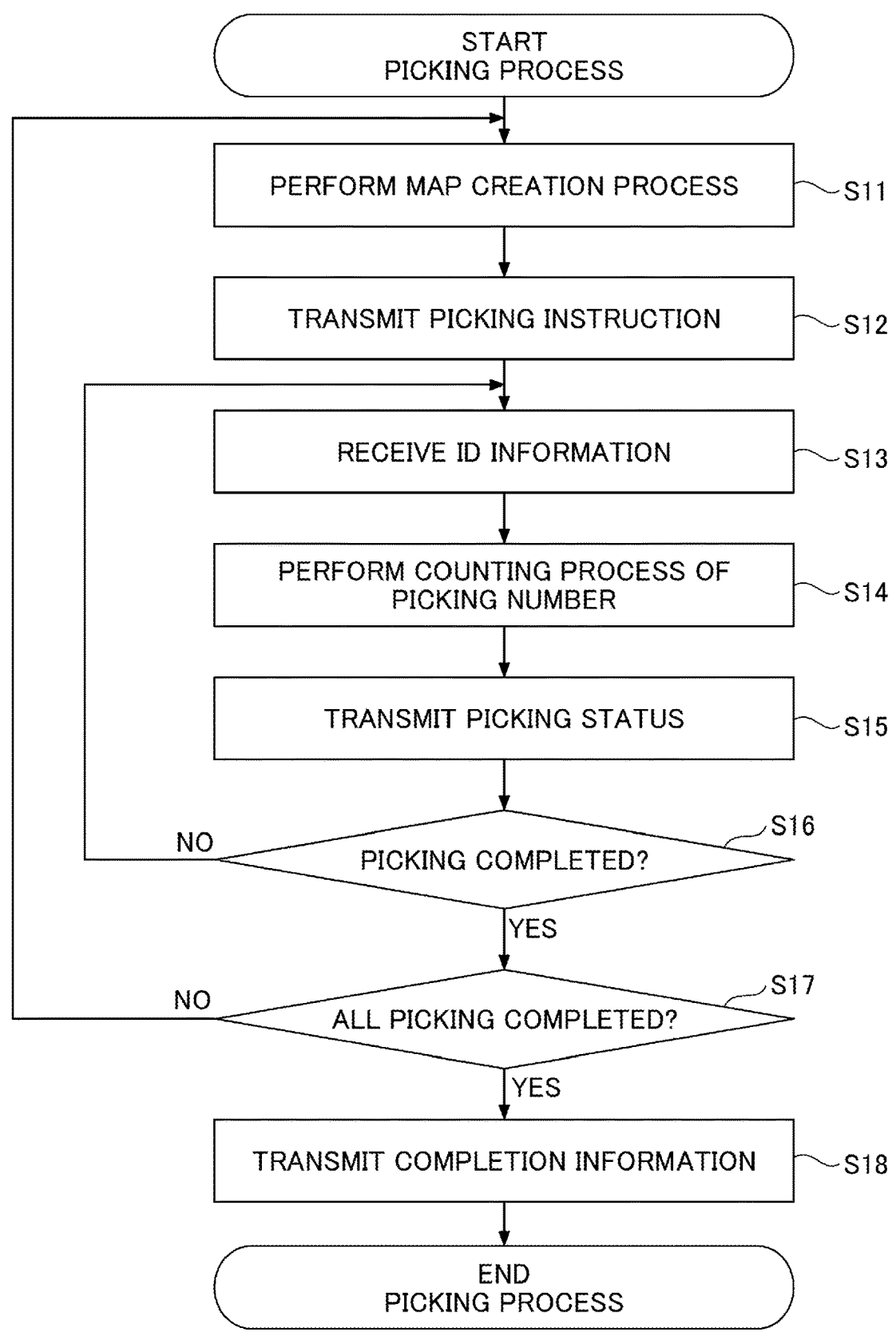
FIG. 10 is a flowchart of a picking process in the management server 10.

FIG. 10 is a flowchart of a picking process in the management server 10.

The map creating unit 103 performs the map creation process (step S11). At the start of the picking operation, the map creating unit 103 generates a shortest distance route (path) through all the places where the product 40 instructed to the worker to be put into the box 130A or the box 130B is stored. Next, the map creating unit 103 creates a map that clearly represents the generated route, the next picking location (that is, the picking location where the worker is to be directed toward first), and all of the picking locations on the layout diagram of the shelves in the distribution center.

The picking instruction management unit 101 transmits the data of the picking instruction to the tablet computer 150 (step S12). As described above, the picking instruction may include information on the location where the picking assistance robot 100 is to move (that is, the picking location where the picking assistance robot 100 is to move), the product 40 to be put into the box 130A or the box 130B by the worker at that location, and the number of the products 40 to be put into in the box 130A or the box 130B by the worker.

The tablet computer 150 displays the picking instruction transmitted by the picking instruction management unit 101 in S12 on the display. Further, the conveyor vehicle 110 moves to a predetermined location according to the location information included in the picking instruction. The worker may perform the picking operation while looking at the display of the tablet computer 150 of the picking assistance robot 100 moved to the predetermined location. The worker can switch from the screen indicating the picking instruction to the map of S11.

The ID information receiving unit 104 receives the product ID information and the information for identifying the RFID reader 140 from the tablet computer 150 (step S13). Specifically, the ID information receiving unit 104 receives the product ID information written on the RFID tag 41 attached to each product 40 put into the box 130A or the box 130B by the worker.

The count unit 105 performs a picking number counting process based on the product ID information and the information for identifying the RFID reader 140 received in S13 (step S14). Details will be described with reference to FIG. 11.

The picking status management unit 106 transmits the picking status data to the tablet computer 150 based on the picking number counting process performed in S14 (step S15).

The picking status management unit 106 determines whether all of products 40 to be put into the box 130A or the box 130B at the current picking location are housed in the box 130A or the box 130B. If all of products 40 are housed, the process proceeds to step S17. If all of products 40 are not housed, the process returns to step S13.

Returning to step S13, the ID information receiving unit 104 waits for the product ID information from the tablet computer 150.

In step S17, the picking status management unit 106 determines whether all of products 40 to be put into the box 130A or the box 130B (that is, all of products 40 to be put into the box 130A or the box 130B at all picking locations) are housed in the box 130A or the box 130B (step S17). If all of products 40 are housed, the process proceeds to step S18. If all of products 40 are not housed, the process returns to step S11.

Returning to step S11, the map creating unit 103 creates a map in which the picking assistance robot 100 specifies the picking location to be directed next. Specifically, the map creating unit 103 creates a map that clearly represents the route generated at the start of picking (or newly regenerated route), the next picking location (that is, the picking location where the picking assistance robot 100 is to be directed toward the next), and all of the picking locations on the layout diagram of the shelves in the distribution center. Subsequently, in step S12, the picking instruction management unit 101 transmits the data of the picking instruction to the tablet computer 150. The picking instruction may include information on the location where the picking assistance robot 100 is to move (i.e., the picking location where the picking assistance robot 100 is to move next), the product 40 to be put into the box 130A or the box 130E by the worker at that location, and the number of the products 40 to be put into in the box 130A or the box 130B by the worker.

In step S18, the picking status management unit 106 notifies the tablet computer 150 that the picking operation is completed (step S18).

Figure 11:
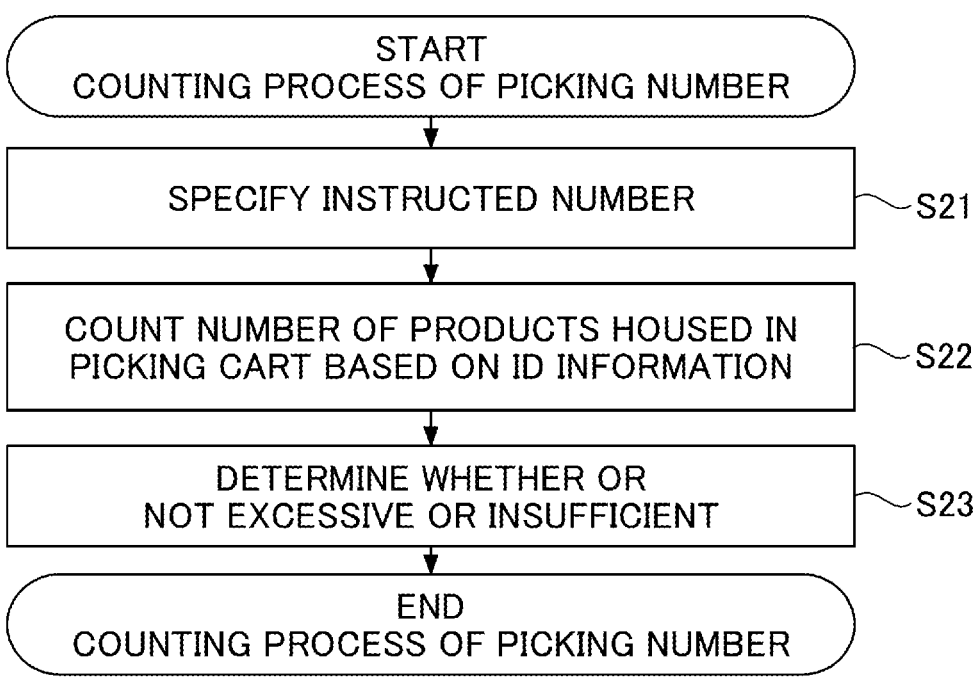
FIG. 11 is a flowchart of a picking number counting process (S14 in FIG. 10)

FIG. 11 is a flowchart of the picking number counting process (S14 in FIG. 10).

The count unit 105 specifies the number of each product 40 instructed to the worker to be put into the box 130A or the box 130B with reference to the picking instruction stored in the picking instruction storage unit 102 (step S21).

The count unit 105 counts the number of each product 40 housed in the boxes 130A and 130B based on the product ID information received from the ID information receiving unit 104 (step S22). Specifically, when the product ID information is received from the ID information receiving unit 104, the count unit 105 determines that the product 40 including the RFID tag 41 in which the product ID information is written is housed in the box 130A or the box 130B.

The count unit 105 determines whether or not the number of each product 40 already in the box 130A or the box 130B is excessive or insufficient with respect to the number of each product 40 instructed to the worker to be put into the box 130A or the box 130B based on the number specified in step S21 and the number counted in step S22 (step S23). Specifically, the count unit 105 determines that the product 40 is insufficient when the instructed number specified in step S21 is larger than the counted number in step S22. The count unit 105 determines that the picking is completed when the instructed number specified in step S21 is the same as the counted number in step S22. The count unit 105 determines that the product 40 is excessive when the instructed number specified in step S21 is smaller than the counted number in step S22.

Figure 12:
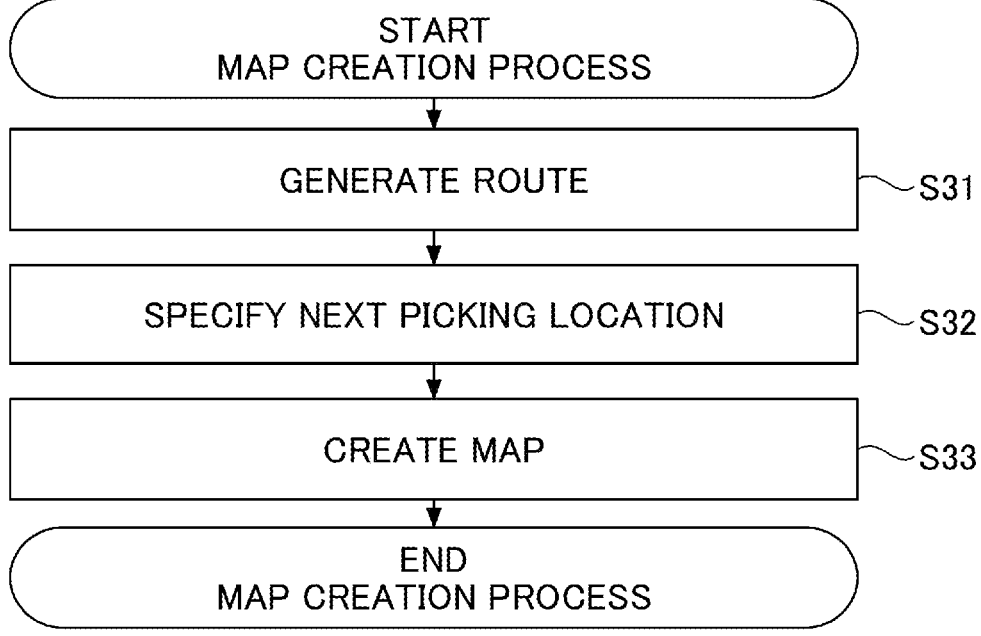
FIG. 12 is a flowchart of a map creation process of an embodiment (S11 in FIG. 10)

FIG. 12 is a flowchart of a map creation process (S11 in FIG. 10) of the embodiment.

The map creating unit 103 generates a shortest distance route (path) through all the places where the product 40 instructed to the worker to be put into the box 130A or the box 130B is stored (step S31).

The map creating unit 103 specifies the next picking location (step S32).

The map creating unit 103 creates a map that clearly represents the route generated in S31, the next picking location specified in S32, and all of the picking locations on the layout diagram of the shelves in the distribution center.

Figure 13:
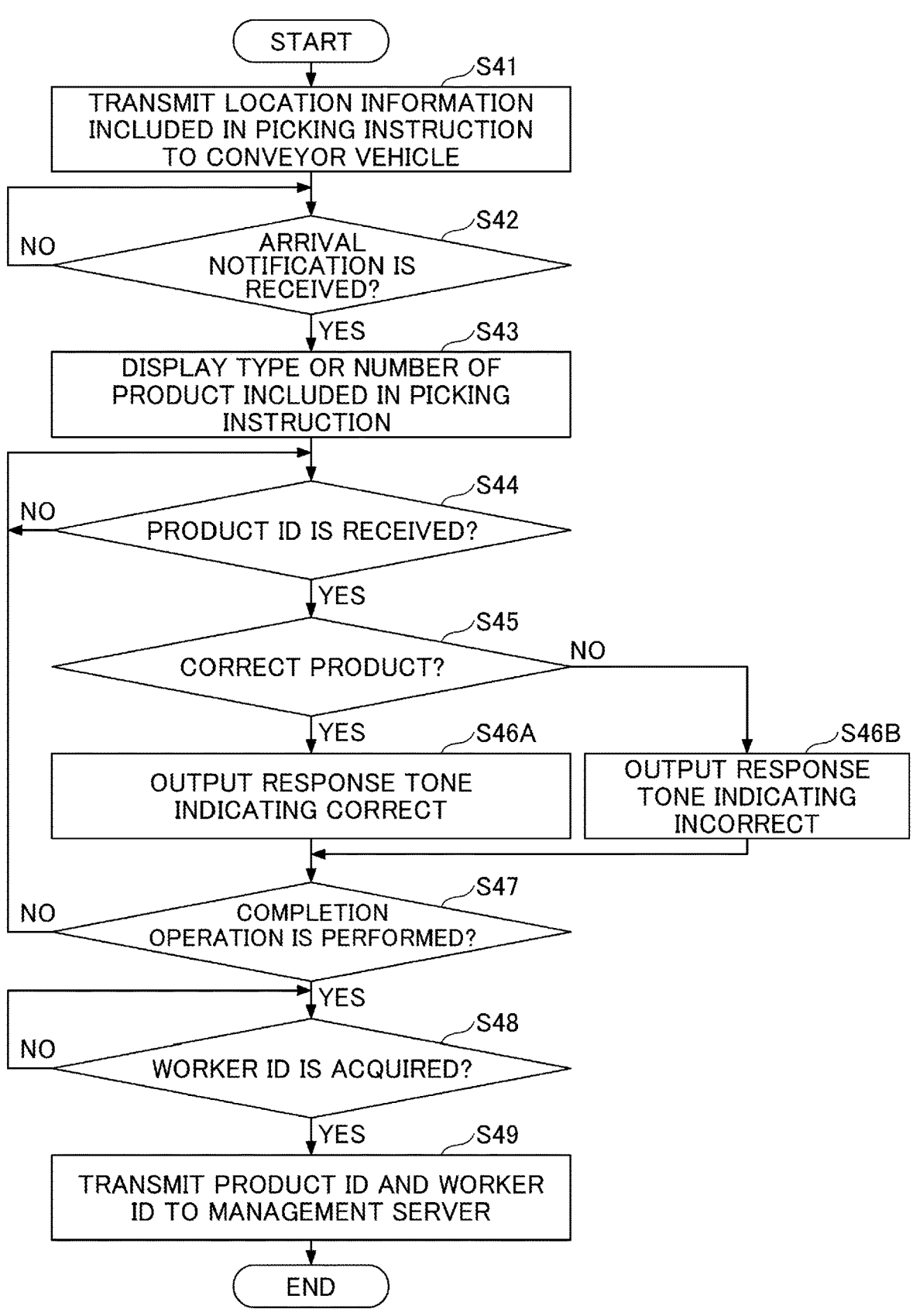
FIG. 13 is a flowchart of a process performed by a controller 151 of the tablet computer 150.

FIG. 13 is a flowchart of a process performed by a controller 151 of the tablet computer 150.

As a prerequisite, the tablet computer 150 is assumed to receive the picking instruction from the management server 10 and store the picking instruction in the memory.

The controller 151 transmits the location information included in the picking instruction to the controller of the conveyor vehicle 110 (step S41). This causes the picking assistance robot 100 to move to the predetermined location represented by the location information.

The controller 151 determines whether an arrival notification is received (step S42). When the arrival notification is determined to be not received, the controller 151 repeatedly executes the process in step S42.

When the controller 151 determines that an arrival notification is received (S42: YES), the type or the number of the products 40 included in the picking instruction are displayed on the display (step S43).

The controller 151 determines whether the product ID information is received from the RFID reader 140 (step S44). When the product ID information is determined to be not received, the controller 151 repeatedly executes the process of step S44.

When the controller 151 determines that the product ID information is received (S44: YES), the controller 151 compares the received product ID information with the type of the product 40 included in the picking instruction to determine whether the product 40 is the correct product 40 to be picked (step S45).

When the controller 151 determines that the product 40 is a correct product (S45: YES), the controller 151 outputs a response tone indicating that the product 40 is a correct product (step S46A).

When the controller 151 determines that the product 40 is not a correct product (S45: NO), the controller 151 outputs a response tone indicating that the product 40 is not the correct product. The response tone output in step S46B is different from the response tone output in step S46A. Therefore, the worker can check the determination result with the response tone.

The controller 151 determines whether a completion operation is performed (step S47). The completion operation is performed by operating the tablet computer 150 when the worker looks at the display of the tablet computer 150 and checks that all products 40 to be picked have been picked at the picking location. The completion operation is, for example, an operation of pressing the OK button. Further, the determination in step S47 is a process of determining whether the completion operation is performed within a predetermined time after the process in step S46A or step S46B is completed. The predetermined time is, for example, five seconds.

When the completion operation is determined to be performed (S47: YES), the controller 151 determines whether a face authentication is performed by the face authenticator 160 and the worker ID information is acquired (step S48). The controller 151 repeatedly performs the process in step S48 until the worker ID information is acquired.

When the worker ID information is determined to be acquired (S48: YES), the controller 151 transmits the product ID information related to the product 40 that is determined to be the correct product 40 to the management server 10 in association with the worker ID information for identifying the worker that is authenticated in Step S48 (step S49). Since the product ID information related to the product 40 is associated with the worker ID information and transmitted to the management server 10, the amount of work and the work efficiency of each worker can be grasped in the management sever 10.

When the process in step S49 is completed, the controller 151 ends a series of processes (END). The controller 151 repeatedly executes the process illustrated in FIG. 13. When the controller 151 executes the process of step S41 again and reads the picking instruction, the picking assistance robot 100 moves to the next picking location. Then, when the arrival notification is received in step S42, the type and number of the products 40 are displayed on the display in step S43 and the picking assistance robot 100 waits. In other words, the picking assistance robot 100 waits in front of the shelf without moving until the completion operation is performed and the worker ID information is acquired by the face authentication. Further, the picking assistance robot 100 moves when the completion operation is performed and the worker ID information is acquired by the face authentication.

When the completion operation is determined to be not performed in step S47 (S47: NO), the controller 151 returns the flow to step S44. This is for receiving the product ID information related to another product 40 because the picking operation has not been completed.

Further, when NO is determined in the process of steps S42, S44, and S48 and the number of times repeating the process of steps S42, S44, and S48 reaches a predetermined number of times (for example, 5 times), the controller 151 may perform error processing. The error processing includes an output of the sound indicating an error and stopping the process illustrated in FIG. 13.

Effect

As described above, the worker can walk to the location where the picking assistance robot 100 is waiting and complete the picking operation at that location by putting the product 40 into the box 130A or the box 130B while looking at the picking instruction displayed on the tablet computer 150. Accordingly, a picking assistance robot 100 and a picking assistance system 1 can be provided which can assist the worker in efficiently picking the product 40.

Further, since the antennas 142A and 142B of the RFID reader 140 can collectively read multiple RFID tags 41, the worker can efficiently and quickly perform the picking operation in a short time. In particular, when the number of products 40 of the same type is large, the collective reading greatly improves work efficiency. An example of such a product 40 is a drug such as a swallowing drug, an injection drug, or an external therapeutic drug, a mask, or other medical clothing or equipment.

Further, when the product 40 is put into the box 130A or the box 130B, it is possible to grasp whether the product 40 is a correct product 40 by the response tone. Therefore, the worker can accurately pick the product 40 and improve work efficiency.

Further, because the worker is authenticated by the face authenticator 160, the amount of work and the work efficiency for each worker can be grasped.

Further, because the picking assistance robot 100 waits in front of the shelf without moving until the completion operation is performed and the worker ID information is acquired by the face authentication, the picking assistance robot 100 can improve the work efficiency by moving according to the worker's intention.

Further, because the picking assistance robot 100 moves when the completed operation is performed and the worker ID information is acquired by the face authentication, the work efficiency can be improved by moving the robot according to the worker's intention.

Further, because the picking assistance robot 100 moves in front of the shelf or the like in which the product 40 is located according to the picking instruction with respect to the product 40 at a location different from the present location, the work efficiency can be improved by moving according to the worker's intention.

Further, if the picking assistance robot 100 is configured to automatically go and return between the packaging station 5 and the area where the shelf 6 is located, the worker can concentrate on the picking operation in the area where the shelf 6 is located and is not required to return to the packaging station 5, thereby significantly improving the work efficiency.

Further, after the product 40 is taken out from the boxes 130A and 130B of the picking assistance robot 100 at the packaging station 5, the picking assistance robot 100 moves to the location included in the picking instruction and waits. Accordingly, the worker can concentrate on the picking operation and is not required to return to the packaging station 5 for taking out the products 40 from the boxes 130A and 130B, thereby significantly improving the work efficiency.

Further, the antennas 142A and 142B are located directly above the boxes 130A and 130B, respectively, so that the RFID tag of the product housed in the boxes 130A and 131B through the inlets 131A and 131B can be reliably read, even if the product has a metal package or the product contains a liquid. Further, an occurrence of the reading omission can be prevented.

Further, since the antennas 142A and 142B are provided at the inlets 131A and 131B of the boxes 130A and 130B, the product 40 for which the RFID tag 41 is read is put into the box 130A or the box 130B. Accordingly, it is not necessary to confirm that the product 40 is put into the box 130A or the box 130B, and the work efficiency can be improved. Further, by reading the RFID tag 41 from the upper side of the boxes 130A and 130B, the RFID tag 41 of the product 40 to be put into the box 130A or the box 130B is read even when a number of other products 40 are housed in the boxes 130A and 130B.

Further, as the shield 170 is provided between the box 130A and the antenna 142B, the antenna 142A can be prevented from reading the RFID tag attached to the product housed in the box 130B. In other words, the product 40 put into the box 130A or the box 130B can be accurately read by the antennas 142A and 142B, and a reading error can be prevented.

Hardware Configuration

Figure 14:
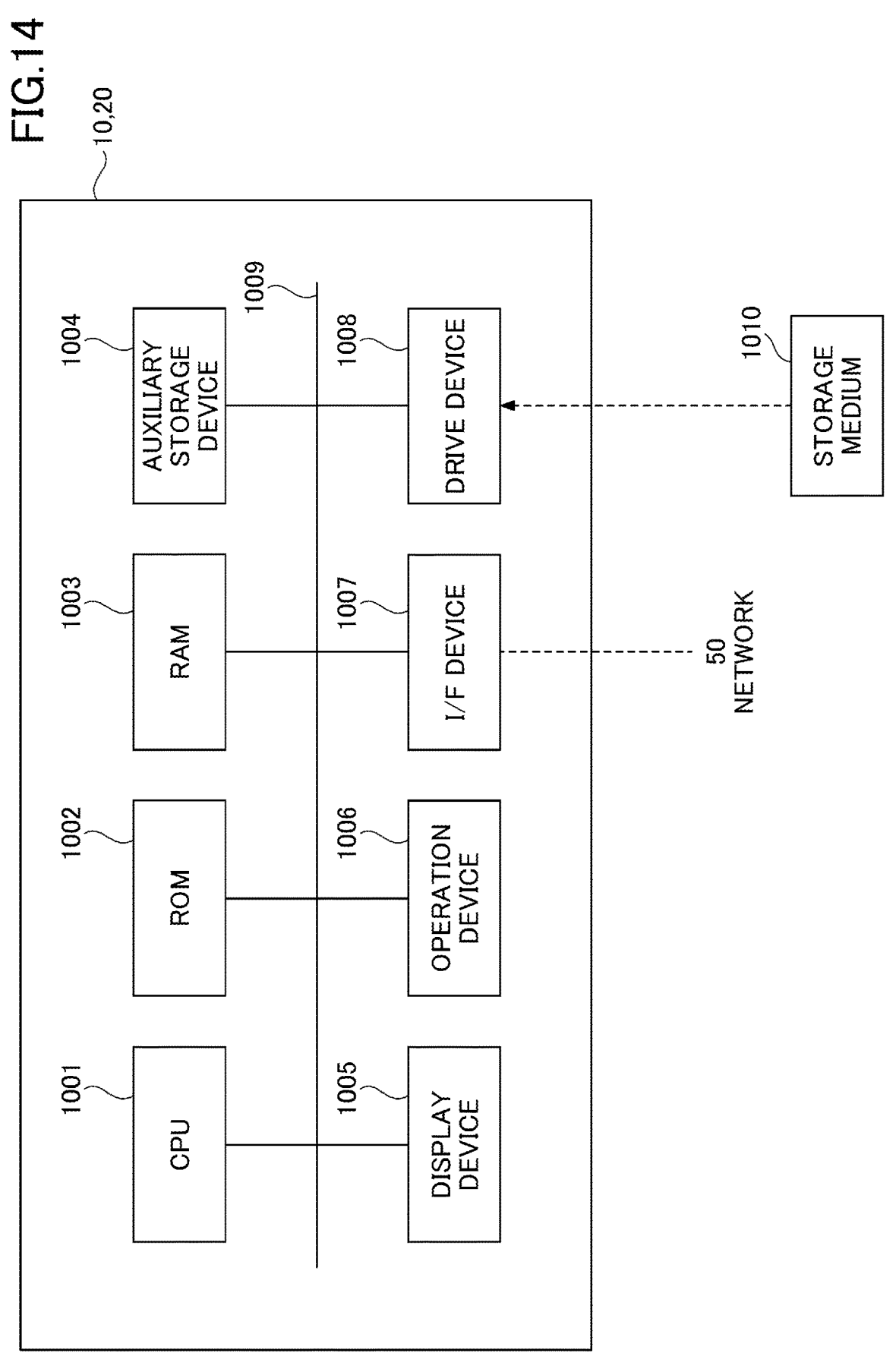
FIG. 14 is a diagram illustrating hardware configuration of the management server 10 and the tablet computer 150 according to an embodiment.

FIG. 14 is a diagram illustrating a hardware configuration of the management server 10 and the tablet computer 150 of the embodiment. The management server 10 and the tablet computer 150 include a Central Processing Unit (CPU) 1001, a Read Only Memory (ROM) 1002, and a Random Access Memory (RAM) 1003. The CPU 1001, the ROM 1002, and the RAM 1003 form a so-called computer.

The management server 10 and the tablet computer 150 include an auxiliary storage device 1004, a display device 1005, an operation device 1006, an interface (I/F) device

1007, and a drive device 1008. The hardware of the management server 10 and the tablet computer 150 is interconnected via the bus 1009.

The CPU 1001 is an arithmetic device that executes various programs installed in the auxiliary storage device 1004.

The ROM 1002 is a non-volatile memory. The ROM 1002 functions as a main storage device for storing various programs and data necessary for executing various programs installed in the auxiliary storage device 1004 by the CPU 1001. Specifically, the ROM 1002 functions as a main storage device for storing boot programs such as a Basic Input/Output System (BIOS) and an Extensible Firmware Interface (EFI).

The RAM 1003 is a volatile memory such as a Dynamic Random Access Memory (DRAM) or a Static Random Access Memory (SRAM). The RAM 1003 functions as a main storage device that provides a workspace deployed when various programs installed in the auxiliary storage device 1004 are executed by the CPU 1001.

The auxiliary storage device 1004 is an auxiliary storage device that stores various programs and information to be used when various programs are executed.

The display device 1005 is a display device for displaying the internal state or the like of the management server 10 and the tablet computer 150.

The operation device 1006 is an input device in which an administrator of the management server 10 and the tablet computer 150 inputs various instructions to the management server 10 and the tablet computer 150.

The I/F device 1007 is a communication device for connecting to the network 50 and communicating with the management server 10 and the tablet computer 150.

The drive device 1008 is a device for setting a storage medium 1010. Herein, the storage medium 1010 includes a medium that optically, electrically, or magnetically records information, such as a CD-ROM, a flexible disk, a magneto-optical disk, or the like. Further, the storage medium 1010 may also include a semiconductor memory or the like that electrically records information, such as an Erasable Programmable Read Only Memory (EPROM), a flash memory, or the like.

For example, various programs to be installed in the auxiliary storage device 1004 are installed when the distributed storage medium 1010 is set in the drive device 1008 and various programs recorded in the storage medium 1010 are read out by the drive device 1008. Alternatively, various programs to be installed in the auxiliary storage device 1004 may be installed by being downloaded from another network different from the network 50 via the I/F device 1007.

Although the picking assistance robot and the picking assistance system 1 of the exemplary embodiment of the present disclosure have been described above, the present disclosure is not limited to specifically disclosed embodiments, and various modifications and variations can be made without departing from the scope of the claims.

This international application claims priority based on the Japanese patent application 2020-143905 filed on Aug. 27, 2020, and the entire contents of which are incorporated herein by reference.

DESCRIPTION OF THE REFERENCE NUMERALS

1 picking assistance system
10 management server
40 product

41 RFID tag
50 network
100, 100A, 100B, 100C picking assistance robot
101 picking instruction management unit
102 picking instruction storage unit
103 map creating unit
104 ID information receiving unit
105 count unit
106 picking status management unit
110 conveyor vehicle
120 frame
130A and 130B box
140 RFID reader
141 main body
142A, 142B antenna
150 tablet computer
160 face authenticator
170 shield
1001 CPU
1002 ROM
1003 RAM
1004 auxiliary storage device
1005 display device
1006 operation device
1007 I/F device
1008 drive device
1009 bus
1010 storage medium

What is claimed is:

1. A picking assistance robot comprising:
a first housing, and a second housing arranged below the first housing, each of the first housing and the second housing configured to house a product to which an RFID tag is attached;
an RFID reader including a first antenna and a second antenna, the first antenna disposed at a position capable of reading the RFID tag when the product is housed in the first housing, and the second antenna disposed at a position capable of reading the RFID tag when the product is housed in the second housing;
a terminal configured to receive a picking instruction;
a mobile body containing the first housing, the second housing, and the RFID reader, the mobile body configured to move to a location where the product is arranged based on location information of the product included in the picking instruction; and
a shield disposed closer to the second antenna of the RFID reader than the first antenna of the RFID reader, the shield configured to block reading of the RFID tag by the second antenna of the RFID reader.

2. The picking assistance robot according to claim 1, wherein the terminal, upon recognizing that the RFID tag is read by the RFID reader when the product is housed in the first housing or the second housing, outputs a response tone indicating that the RFID tag is recognized or displays a response indication indicating that the RFID tag is recognized.

3. The picking assistance robot according to claim 2, further comprising an authenticator that performs an authentication of a worker when the terminal recognizes that the RFID tag is read by the RFID reader when the product is housed in the first housing or the second housing.

4. The picking assistance robot according claim 1, wherein the mobile body waits without moving until an operation representing completion of work with respect to the terminal is performed by a worker, after the RFID tag is read by the RFID reader when the product is housed in the first housing or the second housing.

5. The picking assistance robot according to claim 1, wherein the mobile body moves to a location, based on location information included in a moving instruction, when an operation representing completion of work with respect to the terminal is performed by a worker after the RFID tag is read by the RFID reader when the product is housed in the first housing or the second housing.

6. The picking assistance robot according to claim 5, wherein the moving instruction is an instruction of picking with respect to another product different from the product included in the picking instruction, and
wherein the mobile body moves to a location where the another product different from the product included in the picking instruction is arranged based on location information of the another product.

7. The picking assistance robot according to claim 5, wherein a location included in the moving instruction is a location where the product housed in the first housing or the second housing is to be taken out.

8. The picking assistance robot according to claim 7, wherein the mobile body moves to a location where the product is arranged, based on location information of the product included in another picking instruction, when the terminal reads the another picking instruction after the mobile body moves to the location where the product housed in the first housing or the second housing is taken out according to the moving instruction.

9. The picking assistance robot according to claim 1, wherein the first antenna is provided at an inlet of the first housing, and
wherein the second antenna is provided at an inlet of the second housing.

10. The picking assistance robot according to claim 9, wherein the inlet of the first housing is located above the first housing, and the first antenna is provided above the inlet of the first housing, and
wherein the inlet of the second housing is located above the second housing, and the second antenna is provided above the inlet of the second housing.

11. A picking assistance system that includes a server and the picking assistance robot as claimed in claim 1, the picking assistance system comprising:
a picking instruction management unit configured to transmit a picking instruction;
an ID information receiving unit configured to receive ID information written on an RFID tag attached to a product read by an RFID reader;
a count unit configured to count a number of products housed in the first housing or the second housing based on the ID information; and
a picking status management unit configured to transmit a picking status based on the number of the counted products.

12. The picking assistance system according to claim 11, wherein the count unit determines whether or not a number housed in the first housing or the second housing is excessive or insufficient with respect to a number instructed by the picking instruction, and
the picking status management unit displays on a terminal one message, from among the following: the product is insufficient, picking is completed, and the product is excessive.

* * * * *